US009355171B2

(12) United States Patent
Thomas et al.

(10) Patent No.: US 9,355,171 B2
(45) Date of Patent: May 31, 2016

(54) CLUSTERING OF NEAR-DUPLICATE DOCUMENTS

(75) Inventors: Joy Thomas, Sunnyvale, CA (US); Sauraj Goswami, Palo Alto, CA (US); Vamsi Salaka, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 270 days.

(21) Appl. No.: 12/870,733

(22) Filed: Aug. 27, 2010

(65) Prior Publication Data

US 2011/0087668 A1 Apr. 14, 2011

Related U.S. Application Data

(60) Provisional application No. 61/250,135, filed on Oct. 9, 2009.

(51) Int. Cl.
*G06F 17/30* (2006.01)

(52) U.S. Cl.
CPC ...... *G06F 17/30705* (2013.01); *G06F 17/3071* (2013.01)

(58) Field of Classification Search
CPC .................................. G06F 17/30705
USPC .......................................... 707/737
See application file for complete search history.

(56) References Cited

U.S. PATENT DOCUMENTS

| | | | |
|---|---|---|---|
| 6,240,409 B1 | 5/2001 | Aiken | |
| 6,745,205 B2 | 6/2004 | Choi | |
| 6,757,675 B2 | 6/2004 | Aiken | |
| 6,785,669 B1 | 8/2004 | Aggarwal | |
| 6,990,628 B1 | 1/2006 | Palmer | |
| 7,158,961 B1 | 1/2007 | Charikar | |
| 7,353,224 B2 | 4/2008 | Chen | |
| 7,433,869 B2 | 10/2008 | Gollapudi | |
| 7,574,449 B2 | 8/2009 | Majumder | |
| 2003/0061025 A1 | 3/2003 | Abir | |
| 2005/0060643 A1 | 3/2005 | Glass | |

(Continued)

FOREIGN PATENT DOCUMENTS

| | | |
|---|---|---|
| WO | WO 00/33215 A1 | 6/2000 |
| WO | WO 2008/009991 A1 | 1/2008 |

OTHER PUBLICATIONS

Andoni, Alexandr et al.; "Near-Optimal hashing algorithms for approximate nearest neighbors"; 2008, Communications of the ACM, vol. 51, No. 1, pp. 117-122.

(Continued)

*Primary Examiner* — Thu-Nguyet Le
(74) *Attorney, Agent, or Firm* — Hewlett Packard Enterprise Patent Department

(57) ABSTRACT

Documents likely to be near-duplicates are clustered based on document vectors that represent word-occurrence patterns in a relatively low-dimensional space. Edit distance between documents is defined based on comparing their document vectors. In one process, initial clusters are formed by applying a first edit-distance constraint relative to a root document of each cluster. The initial clusters can be merged subject to a second edit-distance constraint that limits the maximum edit distance between any two documents in the cluster. The second edit-distance constraint can be defined such that whether it is satisfied can be determined by comparing cluster structures rather than individual documents.

20 Claims, 9 Drawing Sheets

(56) References Cited

U.S. PATENT DOCUMENTS

| | | |
|---|---|---|
| 2006/0095521 A1 | 5/2006 | Patinkin |
| 2007/0038659 A1 | 2/2007 | Datar |
| 2007/0083492 A1 | 4/2007 | Hohimer |
| 2007/0136243 A1 | 6/2007 | Schorn |
| 2007/0174267 A1* | 7/2007 | Patterson et al. ............ 707/5 |
| 2008/0082531 A1* | 4/2008 | Suarez ........................ 707/7 |
| 2008/0133496 A1 | 6/2008 | Kanungo |
| 2008/0183693 A1 | 7/2008 | Arasu |
| 2008/0205774 A1 | 8/2008 | Brinker |
| 2008/0205775 A1 | 8/2008 | Brinker |
| 2009/0198677 A1 | 8/2009 | Sheehy |
| 2009/0216755 A1 | 8/2009 | Itamar |

OTHER PUBLICATIONS

Gionis, Aristides et al.; "Similarity Search in High Dimension via Hashing"; 1999, Proceedings of the 25$^{th}$ VLDB Conference, Edinburgh Scotland, 12 pages.

Ravichandran, Deepak et al.; "Randomized Algorithms and NLP: Using Locality Sensitive Hash Function for High Speed Noun Clustering"; 2005, *Proceedings of the 43$^{rd}$ Meeting of the ACL*, pp. 622-629.

Salakhutdinov, Ruslan et al.; "Semantic Hashing"; 2009, *International Journal of Approximate Reasoning*, vol. 50, pp. 969-978.

Stein, Benno et al.; "Applying Hash-based Indexing in Text-based Information Retrieval"; 2007, *Faculty of Media, Media Systems*, 7 pages.

\* cited by examiner

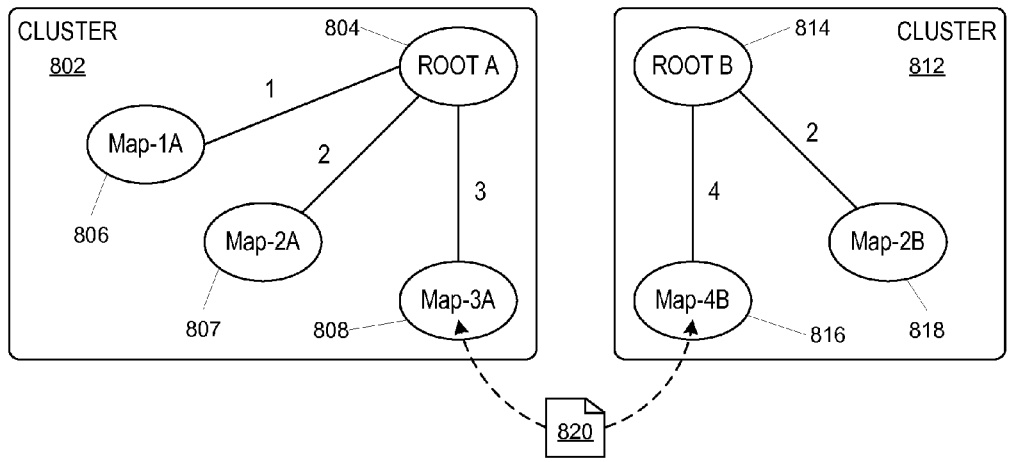
*FIG. 8*
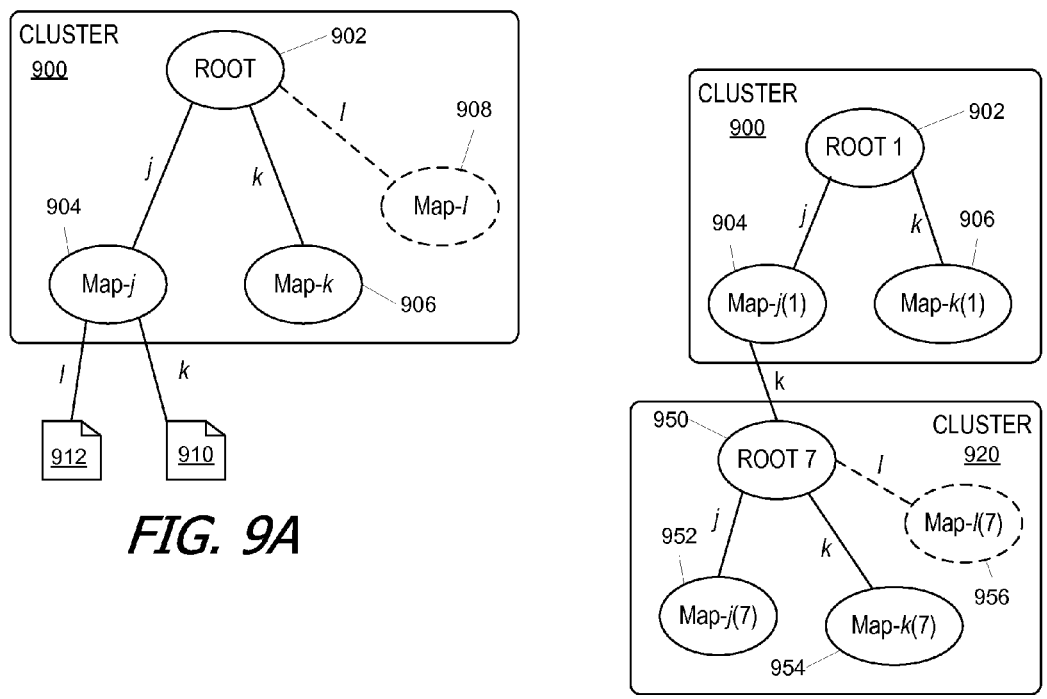
*FIG. 9A*
*FIG. 9B*

CLUSTERING OF NEAR-DUPLICATE DOCUMENTS

CROSS-REFERENCE TO RELATED APPLICATIONS

This application claims the benefit of U.S. Provisional Application No. 61/250,135, filed Oct. 9, 2009, entitled "Clustering of Near-Duplicate Documents," the disclosure of which is incorporated by reference herein in its entirety.

BACKGROUND OF THE INVENTION

The present disclosure relates generally to automated document analysis and in particular to identification and clustering of near-duplicate documents.

With the proliferation of computing devices and communication networks such as the Internet, an ever increasing amount of information is stored in the form of electronic documents. Such documents might be generated using application software such as word processing programs, e-mail programs, web page development tools, etc. Electronic documents can also be generated by scanning paper documents and employing optical character recognition ("OCR") or other techniques to create an electronic representation of the content.

It is often necessary to search through a large collection of electronic documents to find information relevant to a particular question. For example, a number of search services provide interfaces via which users can search electronic documents that are accessible via the World Wide Web. In another context, discovery in civil litigation usually involves the production of massive quantities of electronic documents that the producing and receiving parties must sift through.

Often, a large collection of documents will include multiple documents that are near-duplicates of each other. For example, in the context of electronic document discovery, a party may produce multiple drafts of a contract whose terms were being negotiated. The drafts will often be largely identical in content, but the wording in sections under discussion will vary from one draft to the next. As another example, multiple e-mail messages from the same discussion thread (including e.g., replies and/or forwarded e-mails) may be identical except for the addition of a few words and changes in the message headers from one message to the next. As another example, in the context of the World Wide Web, several pages on different sites may copy the same content from a single source (e.g., a public-domain source), and the pages may differ only in ancillary features such as layout, titles, lists of related links, etc.

Identifying near-duplicates of a document can be useful for a number of purposes. For example, in litigation, the electronic documents being produced often must be reviewed by human reviewers. Having the same reviewer handle a group of near-duplicate documents together improves the likelihood that the documents will be handled consistently. In addition, at times, reviewing each of the near-duplicates can yield interesting and potentially valuable information, such as the history of a contract negotiation. As another example, when a user is searching for a particular document, a single document from a group of near-duplicates can be used as representative of the group.

BRIEF SUMMARY OF THE INVENTION

Identification of near-duplicate documents remains a challenging problem for automated document analysis systems.

In general, existing systems that address the problem of detecting near-duplicate documents rely on non-scalable techniques and/or techniques that are limited to certain types of documents. For example, one technique involves comparing quantitative representations of two documents and identifying the documents as near-duplicates if their quantitative representations meet a minimum threshold of similarity, e.g., 95%. Such pairwise comparison, however is not readily scalable to a large corpus of documents.

Other techniques rely on information content of particular types of documents. For instance, e-mail messages can be grouped by thread based on header fields such as subject line, sender and recipient information, and/or message ID references embedded in the headers. As another example, some documents contain metadata embedded in the document or in a document repository, such as version information, that can be used to identify documents likely to be highly similar; for instance, different versions of the same document can be identified as near duplicates. However, these techniques are limited to particular types of documents and are not generally applicable. Nor are they necessarily reliable. For example, one person can use the "reply" function in e-mail to send an unrelated message, and header-based techniques for identifying near-duplicates could miss the difference in content.

Further complicating the problem is that "near-duplicate" is not a transitive relationship. That is, by making incremental changes to a document $d_1$, one can create successive documents $d_2, d_3, \ldots, d_n$. Each pair of successive documents might be near duplicates of each other, but it is not necessarily the case that $d_1$ and $d_n$ would be near-duplicates.

Embodiments of the present invention provide automated techniques for identifying clusters of near-duplicate document in which addition of documents (or groups of documents) to clusters can be constrained such that each document within the cluster has at least a threshold level of similarity to each other document within the cluster. In some embodiments, each document is represented as a vector in a high-dimensional "word" space with axes corresponding to different words and component values corresponding to the number of occurrences of the words. The high-dimensional content vector for a document can be projected onto a much smaller number (N) of different (preferably though not necessarily orthogonal) axes, with each projection being based on a different subset of the words making up the word space. In one embodiment, the N projections are made using a hash function that is applied separately to a bit string representing the occurrence pattern of words in N different subsets. The N projections form a N-dimensional document vector representing the document. An edit distance between documents is defined in terms of the difference between their document vectors, e.g., as the number of components of the document vector that are different between the two documents. Clusters containing documents that are near-duplicates of each other can be created based on similarity constraints defined in terms of the edit distance.

In certain embodiments, clusters can be formed in a single pass through the set of documents to be clustered. Each cluster has a root document, which can simply be the first document assigned to that cluster; thus, the first document analyzed becomes the root of the first cluster. For subsequent documents, the N-dimensional vector of the current document is compared to the N-dimensional vector of the root document of each extant cluster. If, for some extant cluster, the vectors satisfy an edit-distance constraint, the current document is added to that cluster. If no such cluster exists, a new cluster is created with the current document as its root. Accordingly, documents can be clustered into an arbitrary number of clusters, and because each document within a cluster is constrained to be within a maximum edit distance of the root, the maximum edit distance between any two documents in the cluster is also constrained.

In further embodiments, clusters that have been created based on edit distance to the root can be merged subject to a different constraint on edit distance. For example, in some embodiments, two clusters are merged only if doing so does not increase the maximum edit distance between any two documents within the cluster. Constraints for merging clusters can be defined based on properties of the cluster structures, eliminating the need for pairwise comparisons of documents in the clusters.

Certain aspects of the invention relate to methods for grouping near-duplicate documents that can be implemented n a computer system having a processor and a computer-readable storage medium. For each document in a corpus of documents to be analyzed, the processor can compute a hash vector based on word count information for the document; the hash vector includes some number of components that is advantageously orders of magnitude smaller than the number of recognized words. The processor can assign each document to one (or more) of a number of initial clusters of documents such that each of the initial clusters contains a root document and at least some of the initial clusters further contain at least one child document that satisfies a first edit-distance constraint relative to the root document. The first edit-distance constraint can be defined as an upper limit on a number of components of the hash vectors that are different between the root document and the child document. The processor can then merge the initial clusters to form a plurality of final clusters. During the merging, a first one and a second one of the initial clusters can be merged in the event that the first one of the initial clusters and the second one of the initial clusters satisfy a second edit-distance constraint that requires a similarity of topology between the first initial cluster and the second initial cluster. The processor can store in the computer readable storage medium a list of the documents associated with each of the final clusters.

Certain other aspects of the invention relate to systems for analyzing documents. Such a system can include, for example, a document information data store and a processor. The document information data store is configured to store a vector representation of each document in a corpus. The vector representation is based on frequency of occurrence within the document of words from a dictionary, wherein the vector representation has a dimension that is small compared to the number of words in the dictionary. The processor is configured to form clusters of near-duplicate documents based on the vector representations in the document information data store and to store cluster information in the document information data store, where the cluster information includes a list of the documents associated with each of the clusters of near-duplicate documents. The processor is further configured to form initial clusters of near-duplicate documents by applying a first edit-distance constraint to the vector representations of the documents and to form final clusters of near-duplicate documents from the initial clusters by merging some or all of the initial clusters by applying a second edit-distance constraint to the initial clusters.

Certain other aspects of the invention relate to computer-readable storage media that contain program instructions, which when executed by a processor cause the processor to execute a method of clustering documents based on similarity. The method can include, for example, for each document in a corpus of documents to be analyzed, accessing a document vector that includes several components, each of the components being based on word count information for the document. Each document can be assigned to an initial cluster of documents such that each of the initial clusters contains a root document and at least some of the initial clusters further contain at least one child document such that each child document in the cluster satisfies a first edit-distance constraint relative to the root document of the cluster. The first edit-distance constraint can be defined as a minimum degree of similarity between the document vectors of the root document and the child document. At least some of the initial clusters can be merged to form a set of final clusters; in one embodiment, a first one and a second one of the initial clusters are merged in the event that the first one of the initial clusters satisfies a second edit-distance constraint relative to the second one of the initial clusters, where the second edit-distance constraint is defined as a minimum degree of similarity between topologies of the first and second initial clusters. A list of the documents associated with each of the final clusters can be stored in a document information data store.

The following detailed description together with the accompanying drawings will provide a better understanding of the nature and advantages of the present invention.

BRIEF DESCRIPTION OF THE DRAWINGS

FIG. 8 is a network graph illustrating a document that matches edit distance constraints for multiple clusters according to an embodiment of the present invention.

FIGS. 9A and 9B are network graphs illustrating a constraint for merging near-duplicate clusters that can be used to preserve the diameter of a cluster during merging according to an embodiment of the present invention.

DETAILED DESCRIPTION OF THE INVENTION

Embodiments of the present invention provide automated techniques for identifying clusters of near-duplicate document in which addition of documents (or groups of documents) to clusters can be constrained such that each document within the cluster has at least a threshold level of similarity to each other document within the cluster. In some embodiments, each document is represented as a vector in a high-dimensional "word" space with axes corresponding to different words and component values corresponding to the number of occurrences of the words. The high-dimensional content vector for a document can be projected onto a much smaller number (N) of different (preferably though not necessarily orthogonal) axes, with each projection being based on a different subset of the words making up the word space. In one embodiment, the N projections are made using a hash function that is applied separately to a bit string representing the occurrence pattern of words in N different subsets. The N projections form a N-dimensional document vector representing the document. An edit distance between documents is defined in terms of the difference between their document vectors, e.g., as the number of components of the document vector that are different between the two documents. Clusters containing documents that are near-duplicates of each other can be created based on similarity constraints defined in terms of the edit distance.

In certain embodiments, clusters can be formed in a single pass through the set of documents to be clustered. Each cluster has a root document, which can simply be the first document assigned to that cluster; thus, the first document analyzed becomes the root of the first cluster. For subsequent documents, the N-dimensional vector of the current document is compared to the N-dimensional vector of the root document of each extant cluster. If, for some extant cluster, the vectors satisfy an edit-distance constraint, the current document is added to that cluster. If no such cluster exists, a new cluster is created with the current document as its root. Accordingly, documents can be clustered into an arbitrary number of clusters, and because each document within a cluster is constrained to be within a maximum edit distance of the root, the maximum edit distance between any two documents in the cluster is also constrained.

In further embodiments, clusters that have been created based on edit distance to the root can be merged subject to a different constraint on edit distance. For example, in some embodiments, two clusters are merged only if doing so does not increase the maximum edit distance between any two documents within the cluster. Constraints for merging clusters can be defined based on properties of the cluster structures, eliminating the need for pairwise comparisons of documents in the clusters.

System Overview

Figure 1:
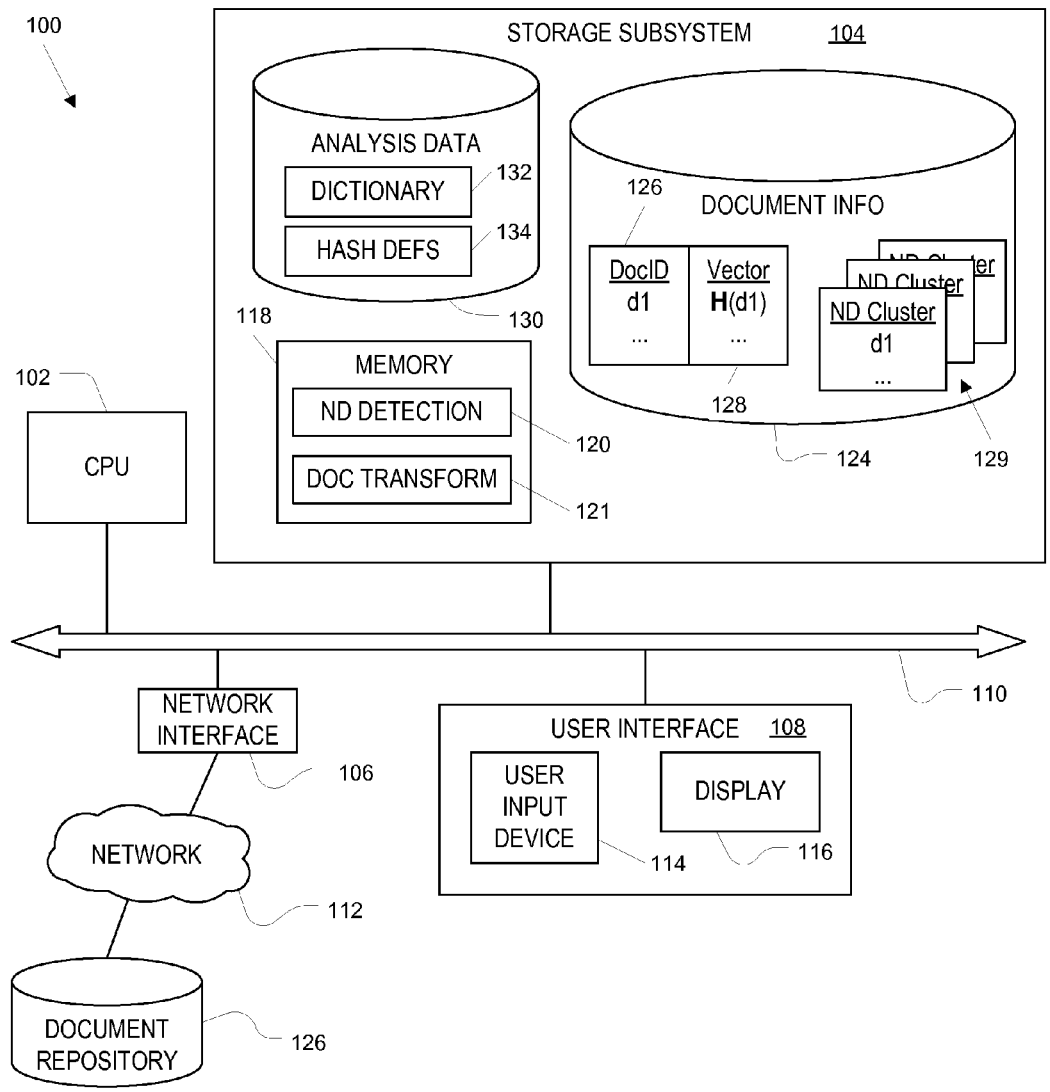
FIG. 1 is a block diagram of a computer system according to an embodiment of the present invention.

FIG. 1 is a block diagram of a computer system 100 according to an embodiment of the present invention. Computer system 100 includes a CPU 102, storage subsystem 104, network interface 106, and user interface 108 connected via a bus 110. CPU 102 can be, e.g., any programmable general-purpose processor. Network interface 106 provides access to one or more other computer systems via a network 112, which can include, e.g., a local area network (LAN), a wide area network (WAN), the Internet (a globally interconnected network of computer networks), a virtual private network, and so on. Network interface 106 can be implemented using standard protocols, including wired protocols (e.g., Ethernet) and/or wireless protocols (e.g., any IEEE 802.11 protocol). User interface 108 can include one or more input devices 114 such as a keyboard, mouse, touch screen, touch pad, etc., and one or more output devices such as a display 116. Bus 110 can be implemented using conventional bus architectures and may include bridges, bus controllers, and the like.

Storage subsystem 104 incorporates various computer-readable storage media to provide storage for programs and data accessed by CPU 102 and/or other components of computer system 100. In the embodiment shown, storage subsystem 104 includes primary memory 118. Primary memory 118 provides the fastest access times and can be implemented using known memory technologies such as DRAM (dynamic random access memory) and/or SRAM (static random access memory). Primary memory 118 is advantageously used at any given time to store programs and/or data that are actively in use by CPU 102. Thus, for example, memory 118 is shown as storing a near-duplicate ("ND") detection program 120 that, when executed, causes CPU 102 to perform near-duplicate detection and clustering operations, e.g., as described below. Memory 118 in this example also stores a document transformation program 121 that, when executed, causes CPU 102 to transform documents to a vector representation (e.g., as described below) that facilitates near-duplicate detection and clustering.

Storage subsystem 104 in this embodiment also provides various secondary storage areas, which can include, e.g., magnetic media such as conventional hard or floppy disks, optical media such as compact disc (CD), digital versatile disc (DVD), or the like, and/or semiconductor media such as flash memory. Secondary storage areas generally have longer access time than primary memory 118 but have larger storage capacity. In this example, secondary storage areas are provided for an analysis data store 130 and a document information data store 124.

Document information data store 124 provides information (also referred to as metadata) about a corpus of documents. As used herein, a "corpus" of documents can be any collection of documents about which information is to be provided to a user of system 100. In one embodiment, the corpus of documents (or a portion thereof) can be stored in a document repository 126 that is remote from computer system 100 and accessible via network interface 106 and network 112. In another embodiment, the corpus (or a portion thereof) can be stored locally, e.g., within storage subsystem 104. The corpus can be centralized or distributed (e.g., it can be a collection of World Wide Web documents that are stored on respective web servers connected to network 112 as is known in the art) as desired, and document information data store 124 might or might not contain actual documents.

Document information data store 124 advantageously contains a unique identifier 126 ("DocID") for each document in the corpus. Identifier 126 can include, e.g., a unique reference to a location where the document is stored or a coded identifier (e.g., an index) that can be used to determine where the document is stored (e.g., by reference to a lookup table), allowing the document to be retrieved by reference to its DocID. Also associated with each document identifier is a characterization of its content in the form of a vector 128, which may be, for example, a hash vector (H). In some embodiments, hash vector H can be generated by CPU 102 executing document transformation program 121; an example is described below.

In this embodiment, document information data store 124 further includes near-duplicate clusters 129. Each near-duplicate cluster 129 includes a list of document identifiers for documents within the cluster, and each cluster 129 advantageously has the property that all documents within the cluster are (with high probability) near-duplicates of each other. Near-duplicate clusters 129 can be created by CPU 102 executing ND detection program 120; examples are described below.

Document information data store 124 can also include any other information about the document, such as dates of creation, editing, and/or addition to the corpus; type of document (e.g., e-mail, web page, word processor document); author;

source or location from which the document was obtained; a condensed representation of document content in a readily searchable form; language information; keywords; categorization information; and so on.

Analysis data store 130 in this embodiment provides data that can be referenced by ND detection program 120 in the course of generating clusters 129. For example, analysis data store 130 can include a dictionary 132. As used herein, a "dictionary" can include any list of words (i.e., character strings) in any language or combination of languages, and the list can include any number of words. Dictionary 132 can be used to define a "word space" for purposes of characterizing a document, e.g., as described below. Analysis data store 130 can also provide a set of hash-component definitions 134 for use in defining a hash vector H. For instance, each hash component can be based on a different subset of the words in dictionary 132. As described below, dictionary 132 and hash component definitions 134 can be used in connection with document transformation program 121 to generate vectors 128.

It will be appreciated that computer system 100 is illustrative and that variations and modifications are possible. For example, although storage subsystem 104 is shown as local to system 100, in alternative embodiments, all or part of storage subsystem 104 can be implemented as remote storage, e.g., on a storage area network (SAN) or other remote server accessible via network 112. Thus, for example, document information data store 124 and/or analysis data store 130 can be stored locally or remotely as desired. Further, although ND detection program 120 and document transformation program 121 are shown as residing in primary memory 118, the invention is not limited to any particular mechanism for supplying program instructions for execution by CPU 102. For instance, at any given time some or all of the program instructions for ND detection program 120 or document transformation program may be present within CPU 120 (e.g., in an on-chip instruction cache and/or various buffers and registers), in a page file or memory mapped file on a system disk, and/or in other local or remote storage space. In some embodiments, computer system 100 might be implemented as a server accessible to a user via a network, and user interface 108 is optional. Computer system 100 may also include additional components such as floppy disk drives, optical media drives (e.g., CD or DVD), network interface components, USB interface, and the like. Computer system 100 can be configured with many different hardware components and can be made in many dimensions and styles (e.g., laptop, tablet, server, workstation, mainframe); network connections may be provided via any suitable transport media (e.g., wired, optical, and/or wireless media) and any suitable communication protocol (e.g., TCP/IP). A particular computer architecture or platform is not critical to the present invention.

Document Transformation

Figure 2:
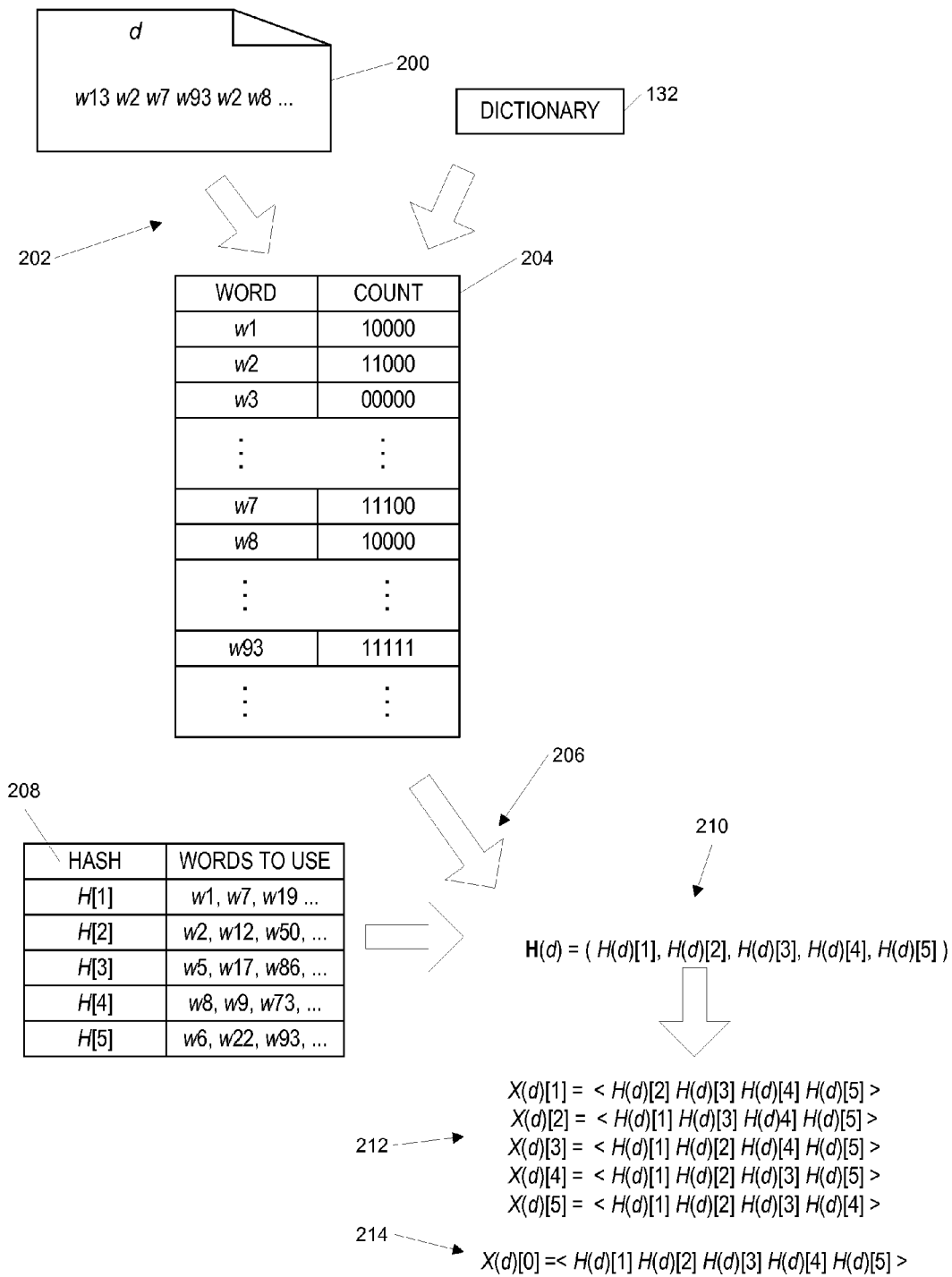
FIG. 2 illustrates a transformation of a document to a vector representation usable in certain embodiments of the present invention.

To facilitate near-duplicate detection, some embodiments of the present invention use a vector representation of documents. FIG. 2 illustrates a transformation of a document 200 to a vector representation usable in certain embodiments of the present invention. Such a transformation can be implemented, e.g., as program code in document transformation program 121.

A document (d) 200 as shown contains a series of words. As used herein, a "word" in a document is a sequence of consecutive characters. Words may be delimited by a word-separation character such as a space character or punctuation mark, by a selected maximum length, or by other techniques for segmenting a document into words. In this embodiment, document 200 includes words w13, w2, w7, etc., which are words from dictionary 132 of FIG. 1.

A first transformation 202 converts document 200 to a count vector 204 in a high-dimensional "word space" in which the coordinate axes (or dimensions) correspond to the different words w1, w2, etc. that are in dictionary 132. Dictionary 132 can have any number of words (e.g., several thousand or tens of thousands or even hundreds of thousands), and accordingly count vector 204 is generally a high-dimensional vector. Transformation 202 determines each component of count vector 204 by counting occurrences within document 200 of each word in dictionary 132. The particular content and number of words in dictionary 132 can be varied as desired. In some embodiments, dictionary 132 may treat words derived from the same stem as a single word so that, for instance, "patent," "patented," "patents," and "patentable" could all be regarded as the same word; in other embodiments, different words formed from the same stem can be treated as different words. Existing word-counting algorithms can be applied for this purpose, and a detailed description is omitted.

In the embodiment of count vector 204 of FIG. 2, the count of occurrences of each word is represented in a unary format. For example, the count for each word can be a fixed-length bit field, and one bit can be set for each occurrence of the word up to a maximum number. Thus, in vector 204, a count of 10000 represents one occurrence, 11000 represents two occurrences, etc. While a five-bit unary representation is used here for simplicity, a larger representation (e.g., 50 bits) can be more informative for large documents. In addition, binary or other formats can also be used to represent the word counts.

It will be appreciated that if transformation 202 is applied to two documents, the degree of difference between the two documents can be measured by determining the number of bits that are different between their count vectors. Thus, whether two documents are near-duplicates could be determined by reference to the number of differences between their count vectors. This pairwise comparison technique, however, is not well suited for a large corpus of documents. Further, large amounts of storage may be required for the count vectors 204, as the vectors may be quite large. In addition, depending on the content of dictionary 132, count vectors 204 may be only sparsely populated, as a given document will generally use only a tiny fraction of the words in a dictionary.

The near-duplicate clustering processes described below use a more efficient representation in which word-count vector 204 is further transformed to a lower-dimensional space by transformation 206, which uses hash definition table 134. Specifically, transformation 206 computes a number of "hash components" (e.g., H(d)[1], H(d)[2] etc.) from count vector 204 to produce a hash vector (H(d)) 210. As shown in hash definition table 134, each hash component is based on a different subset of the words in dictionary 132 (the "words to use"). For a given hash component (e.g., H[1]), the counts from word vector 204 that correspond to the words associated with that hash component (e.g., words w1, w7, w19, etc. for hash component H[1]) are concatenated, and a hash function, which may be of a conventional type, is applied to the concatenation.

An arbitrary number (N) of hash components can be computed in transformation 206. In the embodiment shown, N=5, although other numbers can be used. Each hash component can involve applying the same hash function to the counts for a different subset of the words, or different hash functions can be used to generate different hash components. The subsets of words used for the different hash components are advantageously different. In some embodiments, the same word can be used for multiple hash components (the subsets need not be disjoint), and there is no requirement that the hash components, taken together, incorporate all the words from dictionary 132. Those skilled in the art will recognize that counting in transformation 204 can be limited to those words from dictionary 132 that are included in at least one of the hash components of table 134.

It should be noted that the number of hash components in hash vector 210 is advantageously much smaller (e.g., several orders of magnitude smaller) than the number of words in dictionary 132 or the number of dimensions in count vector 204. To the extent that the hash components H(d)[i] (where i=1, ..., N) are orthogonal—i.e., do not include any of the same words—hash vector 210 can be regarded as a projection of count vector 204 into an N-dimensional space, where N is lower than the dimensionality of the word space. As described below, the similarity of hash vectors for different documents can be used as an approximation of the similarity of their count vectors. There will in general be some false positives (i.e., non-similar documents with similar vectors) due to the loss of information in projecting into a lower-dimensional space; however, for even a relatively small N (e.g., N=5), it has been found that the rate of false positives can be kept acceptably low.

FIG. 2 also illustrates a further optimization in the document representation that is used in certain embodiments described below. From hash vector 210, a "composite hash" vector (X(d)) 212 is generated. As shown, each component X(d)[i] of composite hash vector X(d) is generated by concatenating all of the hash components H(d)[j] for j≠i. Thus X(d) is also an N-dimensional vector that carries the same information as hash vector H(d). In some embodiments, each composite hash component X(d)[i] is generated by applying a hash function to the concatenated hashes, allowing a reduction in the number of bits needed to store the X(d)[i] values for a document; in other embodiments, the concatenation can be used directly as the composite hash. As described below, in some embodiments using composite hash vector X(d), rather than using H(d) directly, can facilitate comparison of documents to detect near-duplicates.

In addition, in the embodiment of FIG. 2, a "global" hash (X(d)[0]) 214 is also provided. As shown, global hash X(d)[0] can be the concatenation of all N components of hash vector H(d); it is a composite hash with no dimension (or hash index) excluded. In some embodiments, the global hash X(d)[0] can be generated by applying a hash function to the concatenation.

It will be appreciated that the transformations shown in FIG. 2 are illustrative and that variations and modifications are possible. The dictionary used to define the word-space and the number of words included may be varied without restriction. The hash vector can include any number of components and each component can be based on any subset of words selected from the dictionary. Selection can be made in a variety of ways, e.g., random assignment of words to different subsets. It is not required that every possible word be associated with a component of the hash vector, nor is assigning the same word to multiple components excluded. Further, as described below, other projection techniques can be used to reduce a document representation from word space to an N-dimensional space, and the present invention is not limited to hash vectors.

The reduction in size and storage requirements achieved using hash vectors can be considerable. For example, in one embodiment, a dictionary can include about 100,000 words, and 25 bits per word can be to represent the occurrence count. In this the case the bit vector describing each document would be 2.5 million bits, and it would be very expensive to calculate and compare bit vectors of this size. Using the hash function can reduce the 100,000 vector components to a small number (e.g., 5 or 7) of hash values, which provides considerable compression.

The dimensionality of the hash vector H (i.e., the number N of hash-vector components) can be selected as a matter of design choice. Multiple hash-vector components are desirable, in part because hash functions are non-local, meaning that similar (though not identical) inputs do not necessarily produce similar outputs. Thus, comparing a single hash-vector component between two documents can tell you whether the documents are alike or not in relation to the characteristics represented in that component, but if the component is not the same, the difference does not correlate with a degree of dissimilarity. Comparing multiple hash-vector components provides additional information because documents that have a high degree of similarity will have hash vectors that are alike in most of their components, with relatively few differences.

Accordingly, increasing the number N of hash-vector components used can provide more information about the documents, thereby reducing the rate of false positives (i.e., documents identified as near-duplicates that are in fact not very similar). On the other hand, increasing the number N of hash-vector components generally increases the computation time, both in generating the hash vectors and in comparing them; it also increases the amount of storage required to store the hash vectors for each document. It has been found that N=5 provides a good tradeoff between processing resource requirements and quality of the results; however, the present invention is not limited to any particular dimensionality.

Edit Distance Metrics for Transformed Documents

As noted above, similarity of two documents can be evaluated by comparing their hash vectors. This provides a quantitative standard for identifying near-duplicate documents. In particular, for embodiments described below, the term "edit distance" between documents a and b, denoted as E(a, b), is used herein to refer to the number of hash-vector components H[i] (also referred to herein as "hash components") that are different between the hash vectors of the two documents a and b. Whether two documents a and b are near-duplicates can then be determined based on the edit distance E(a, b) between them.

If E(a, b)=0 (i.e., the hash vectors are identical), documents a and b are referred to herein as "exact" duplicates. It is to be understood that exact-duplicate documents a and b might not actually be identical in all respects. For example, in the transformations depicted in FIG. 2, word-order information is lost; thus documents that permute the same words would qualify as exact duplicates even though they are not in fact identical. As another example, documents that differ only in regard to words not used in any of the hash components would qualify as exact duplicates even though the documents are not identical.

In certain embodiments, documents that are exact duplicates can be "consolidated" prior to near-duplicate clustering. For example, each set of exact duplicates can be represented as a linked list associated with a single hash vector, and that list can be treated as a single document during subsequent processing. Such consolidation of exact duplicates can speed up processing. Accordingly, the description of clustering embodiments below proceeds as if every document has a unique hash vector, even though this is not necessarily the case; instead, it is understood that "document" as used below can in some instances refer to a consolidation of any number of exact-duplicate documents.

If $0 < E(a, b) \leq M$, for a preselected maximum edit distance $1 \leq M < N$, then documents a and b are near-duplicates. The maximum edit distance M is a tunable parameter, and an optimal selection depends on N and on the degree of tolerance for false positives. In view of the way the hash vector is defined, those skilled in the art will recognize that as M is increased relative to N, the degree of similarity required for documents to be classified as near-duplicate documents is relaxed, and the rate of false positives will tend to increase. As M is decreased toward 1, the rate of false positives is reduced, but the rate of false negatives (i.e., documents that are in fact highly similar but are not identified as near-duplicates) increases.

Figure 3:
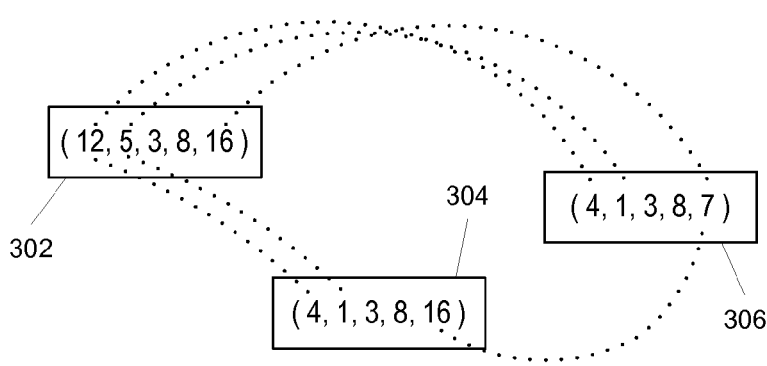
FIG. 3 illustrates edit distances among three documents with 5-component hash vectors determined using the technique described above.

It will be appreciated that "near-duplicate" is not a transitive relationship. For example, FIG. 3 shows three documents 302, 304, 306 with 5-component hash vectors determined using the technique described above. Document 302 has a hash vector (12, 5, 3, 8, 16), document 304 has a hash vector (4, 1, 3, 8, 16) and document 306 has a hash vector (4, 1, 3, 8, 7). The dotted lines indicate which hash components are different between each pair. Thus, $E(302, 304)=2$, $E(304, 306)=1$, and $E(302, 306)=3$. If M=2, then documents 302 and 304 are near-duplicates, and documents 304 and 306 are near duplicates, but documents 302 and 306 are not near-duplicates.

As a result of this, "closure" algorithms suitable for finding documents satisfying a transitive relationship are not generally well-suited for forming clusters of near-duplicate documents. While such algorithms can be applied to the hash-vector representation and edit-distance metrics described above, the result will tend to be over-inclusive: although each document in a cluster may be a near-duplicate of at least one other document in the cluster, it is likely that some of the documents within a cluster will not be near-duplicates of each other. Accordingly, some of the techniques described below restrict the maximum edit distance within a cluster (referred to herein as "cluster diameter") to increase the likelihood that any two documents within the same cluster are in fact highly similar to each other.

Restrictive Near-Duplicate Clustering

Figure 4:
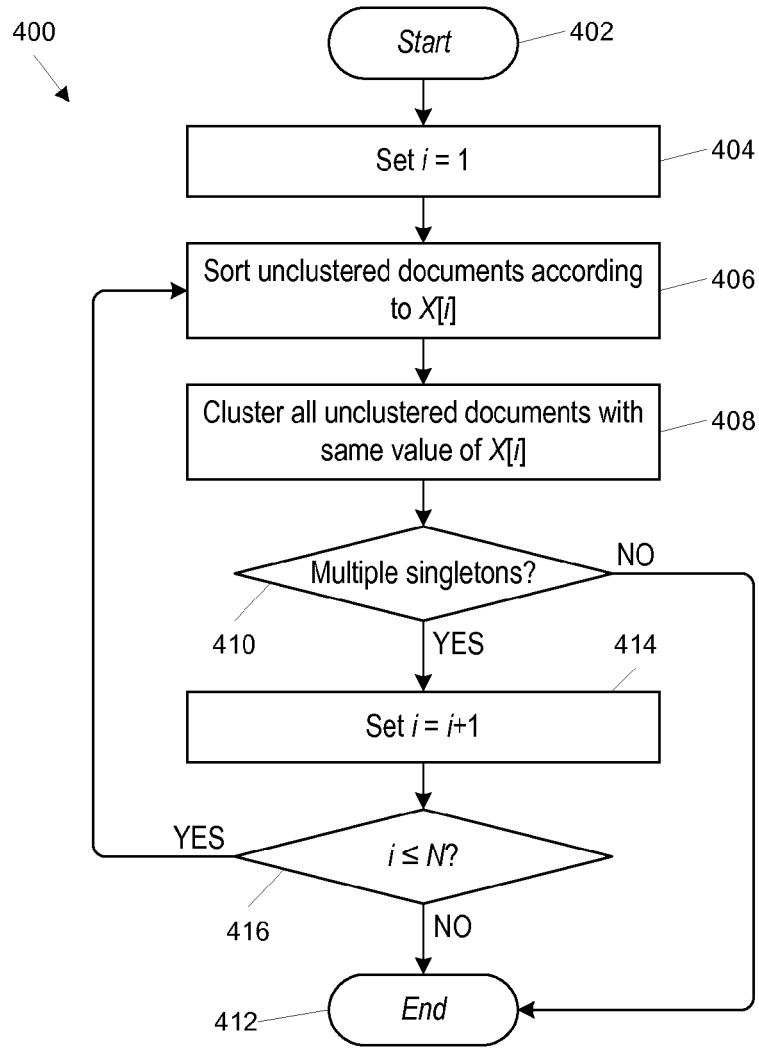
FIG. 4 is a flow diagram of a process for forming clusters of near-duplicate documents with an edit-distance constraint according to an embodiment of the present invention.

FIG. 4 is a flow diagram of a process 400 for forming clusters of near-duplicate documents with an edit-distance constraint according to an embodiment of the present invention. Process 400 limits the maximum edit distance within any cluster to 1.

Process 400 begins (block 402) after the transformations of FIG. 2 have been applied to each document in a corpus to be analyzed. The representation of each document in this embodiment includes the composite hash vector X as defined above. At block 404, a hash index i is initialized, e.g., to 1. At block 406, a list of all the documents is sorted according to the value of composite hash X[i]. At block 408, a cluster is formed for each different value of X[i] in the list. For the case where i=1, since X[1] is identical for two documents only if H[2], H[3], . . . , H[N] (i.e., all hash components except H[1]) are all identical, all documents with the same value of X[1] are necessarily within edit-distance 1 of each other.

It is possible that a document may have a value of X[1] that does not match any other document; accordingly, some of the clusters formed at block 408 may be singletons, i.e., clusters containing only one document. At block 410, it is determined whether any of the clusters formed at block 408 are singletons; if not, process 400 can end (block 412). If singletons remain, then at block 414, hash index i is incremented; as long as hash index i has a valid value (less than or equal to N) at block 416, process 400 returns to block 406 to sort the singletons according to X[i] and create additional clusters. Process 400 can continue in this manner until no more singletons remain or until all hash index values (i.e., all N components of the composite hash vector X) have been exhausted.

It will be appreciated that clustering process 400 is illustrative and that variations and modifications are possible. Actions or operations described as sequential may be executed in parallel, order of actions or operations may be varied, and operational blocks may be modified, combined, added or omitted. For instance, the composite hashes can be considered in an arbitrary order. Alternatively, hash components can be compared directly to determine whether two documents differ in only one hash component rather than using the composite hashes as described. Other implementations are also possible.

By requiring edit-distance 1 for all documents within a cluster, process 400 can minimize the likelihood of false positives for a given definition of the hash components; however, process 400 also restricts the cluster size. For many applications, the restricted cluster size can be a drawback, as there may be many false negatives. Accordingly, other embodiments provide more relaxed constraints on edit distance within a cluster.

Near-Duplicate Clustering Based on Edit Distance from a Root

Another group of embodiments provides clustering based on a root document (also referred to as a "root"). In these embodiments, all documents within a cluster are constrained to be within edit-distance 1 of the root document for that cluster and consequently all documents in the cluster are within edit-distance 2 of each other.

Figure 5:
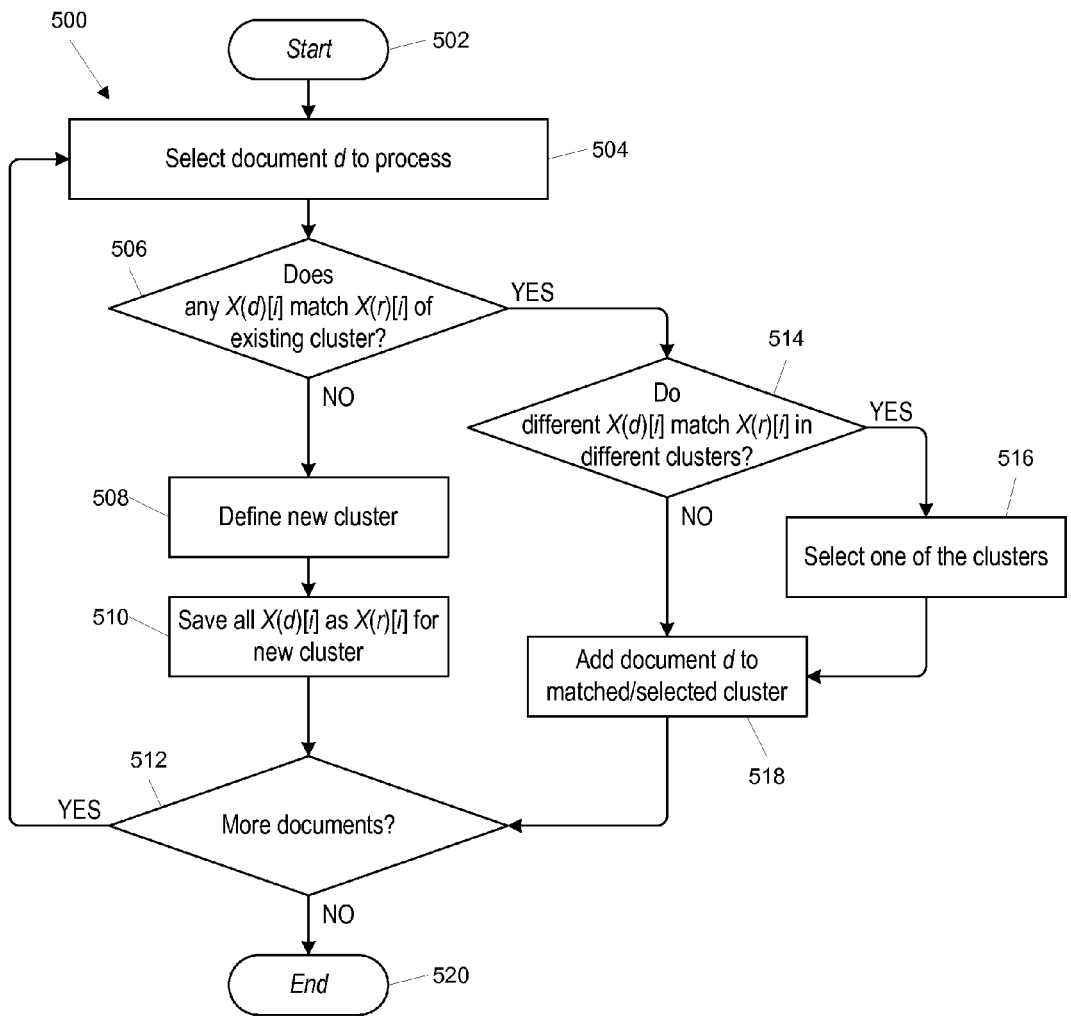
FIG. 5 is a flow diagram of process for clustering near-duplicates using a root document and an edit distance constraint according to an embodiment of the present invention.

FIG. 5 is a flow diagram of process 500 for clustering near-duplicates using a root document and an edit distance constraint according to an embodiment of the present invention. Process 500 begins (block 502) after the transformations of FIG. 2 have been applied to each document in a corpus to be analyzed. The representation of each document in this embodiment can include the N-dimensional composite hash vector X as well as the hash vector H. In some embodiments, consolidation of exact duplicates (as described above) can be performed before or when process 500 begins; accordingly, the following description assumes each document has a unique hash vector H, and it is understood that some "documents" may in fact be groups of exact duplicates. However, at this point, no clusters have been created.

At block 504, a first document d to be processed is selected. Order of selection is not critical, and documents can be processed in any order. As will be seen, in process 500 each document is processed once. At block 506, it is determined whether the document d has edit distance 1 from the root document of any existing cluster, e.g., by comparing the composite hash vector components X(d)[i] for the current document to the composite hash vector components X(r)[i] for the root document of an extant cluster. In an alternative embodiment, components of hash vector H can be compared directly.

For the first document to be processed, no clusters exist and the determination at block 506 would be negative. Accordingly, at block 508, a new cluster is defined with the first document d as its root (r). Thus, in this embodiment, the root of a cluster is simply the first document added to it. The composite hashes for the current document d, denoted X(d)[i] in FIG. 5, are stored as the root composite hashes X(r)[i] for the new cluster at block 510. At block 512, it is determined whether more documents remain to be processed If so, process 500 returns to block 504 to select a new document d to process.

For each document d, block 506 compares the composite hashes X(d)[i] of document d to the composite hashes X(r)[i] associated with the roots r of existing clusters. Because of the way the composite hashes are defined, if any X(d)[i] for document d, matches the corresponding X(r)[i] for the root r, then E(d, r)=1; thus all documents added to a cluster have edit distance of 1 from the root. If no match is detected, a new cluster is created with document d as its root at blocks 508 and 510.

If, however, a match is detected at block 506, then document d can be added to an existing cluster. More specifically, at block 514, it is determined whether the X(d)[i] for different hash indexes i match X(r)[i] for different clusters. If so, then one of the matched clusters is selected at block 516. In one embodiment, the first cluster for which a match is found during traversal of the cluster list is selected without actually determining whether any other matches exist. In another embodiment, the largest cluster for which a match is found is selected. In still other embodiments, cluster selection at block 514 can be random. In still other embodiments, cluster selection at block 514 can be based on a preference for certain cluster structures; for example, in certain embodiments described below, it may be desirable to limit the number of different composite hash components X(r)[i] of a given root that have matching documents within the cluster. At block 518, the document d is added to the matched cluster (or the selected one of the matched clusters in the event of multiple matches), and process 500 proceeds to block 512 to continue processing documents. After all documents have been processed, process 500 ends (block 520).

Process 500 results in assigning every document to one cluster, although (as with process 400) some of the clusters may be singletons. Each cluster has at least a root document (the first document added to the cluster), and some of the clusters will have one or more other "child" documents that differ from the root in exactly one of the N hash components. (A child that differs from the root in the jth hash component is sometimes referred to herein as a "j-child" of the root.) Different documents within the same cluster may differ from the root in different hash components; for instance, a root may have j-children and k-children for j≠k. Thus, the maximum edit distance between any two documents in the cluster is 2.

It will be appreciated that clustering process 500 described herein is illustrative and that variations and modifications are possible. Steps described as sequential may be executed in parallel, order of steps may be varied, and steps may be modified, combined, added or omitted. For instance, the individual hash components H[i] can be compared directly instead of comparing composite hashes X[i] as described. Documents that are at edit-distance 1 from roots of multiple clusters can be handled in different ways, as noted above. In addition, consolidation of exact duplicates prior to clustering is not required. For example, exact duplicates of a root document can be identified and grouped with the root during clustering; exact duplicates of a child document can simply be clustered together as children of the same root.

Figure 6:
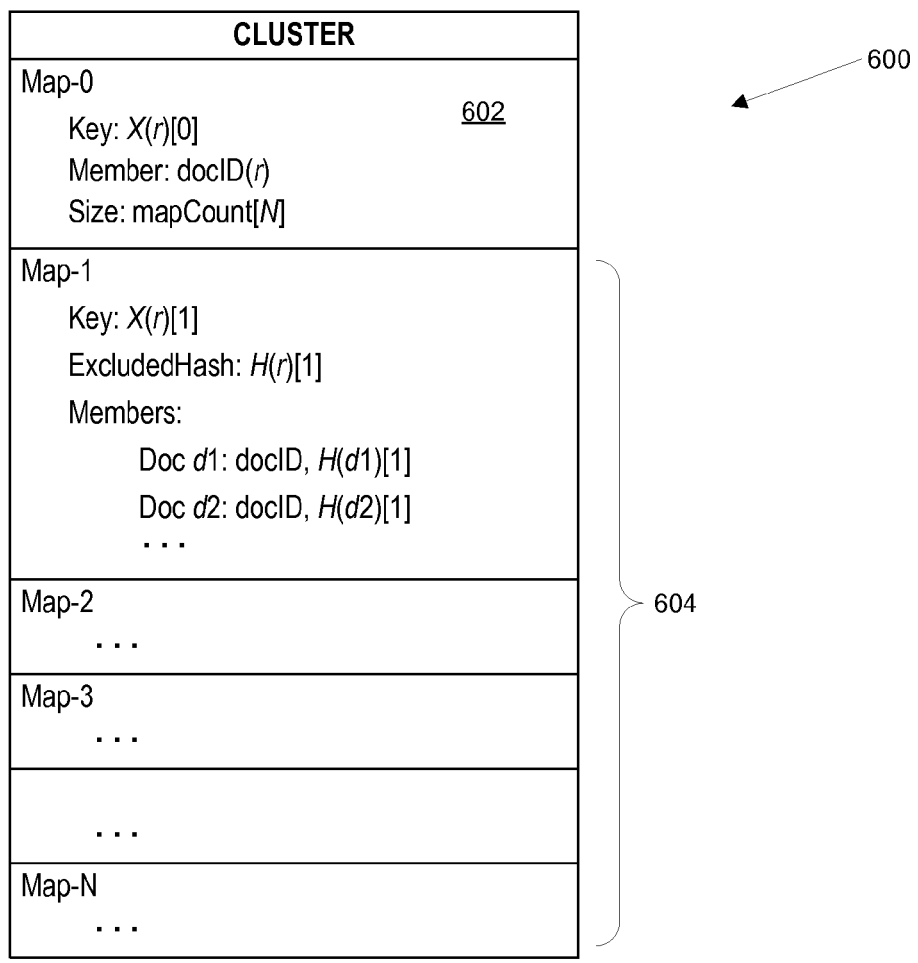
FIG. 6 illustrates a data structure for storing a near-duplicate cluster according to an embodiment of the present invention.

Cluster information can be stored (e.g., as ND clusters 129 in document information data store 124 of FIG. 1) using a variety of data structures. For example, a cluster can be stored as a linked list of the document identifiers for the root and each child. Another example of a cluster data structure 600 is shown in FIG. 6; it will be appreciated that other data structures can also be used. Cluster data structure 600 represents the cluster as a number (N+1) of maps, where N is the dimension of the hash vector. This map-based structure can be used to group children of the root that differ from the root in the same hash vector component H[i].

"Map-0" 602 is a special map representing the root document r. Map-0 602 has the global hash X(r)[0] (defined above with reference to FIG. 2) as a key. Map-0 602 has one member, the root document, identified by its document identifier. Map-0 also provides size information for the cluster; in this embodiment, the size information includes a mapCount array of dimension N, where the array stores the number of documents in each of the remaining maps.

The remaining N maps 604 (also referred to as "child maps") are all similar to each other, and contents are shown in detail only for Map-1. Map-1 identifies all of the child documents d in the cluster for which X(d)[1] matches X(r)[1] (i.e., the 1-children of the root), and more generally Map-i identifies all of the child documents d in the cluster for which X(d)[i] matches X(r)[i] (i.e., the i-children of the root). Accordingly, for Map-1, the key is X(r)[1], the first composite hash component for the root document. For convenience, the hash component H(r)[1] that is excluded from composite hash X(r)[1] can also be stored separately in Map-1.

Map-1 also includes a list (e.g., a linked list) of the 1-children of the root r, i.e., those documents ($d_1$, $d_2$, etc.) that were added to the cluster because X(d)[1] for that document matched X(r)[1]. Assuming that sets of exact duplicates were consolidated prior to clustering, it is expected that any document $d_1$ in Map-1 will have a hash component $H(d_1)$[1] that is different from H(r)[1] and that a different document $d_2$ in Map-1 will have a hash component $H(d_2)$[1] that is different from both H(r)[1] and $H(d_1)$[1]. To keep the complete hash information for each child document readily accessible, each entry in the member list for Map-1 can store the "variable" hash component $H(d_1)$[1] in association with the document identifier. Other child maps 604 have similar structure to Map-1, except that each is associated with a different one of the N hash vector components. It should be noted that some of the child maps for a cluster may be empty. For example, if no document is found that matches X(r)[2], then Map-2 would be empty.

Figure 7:
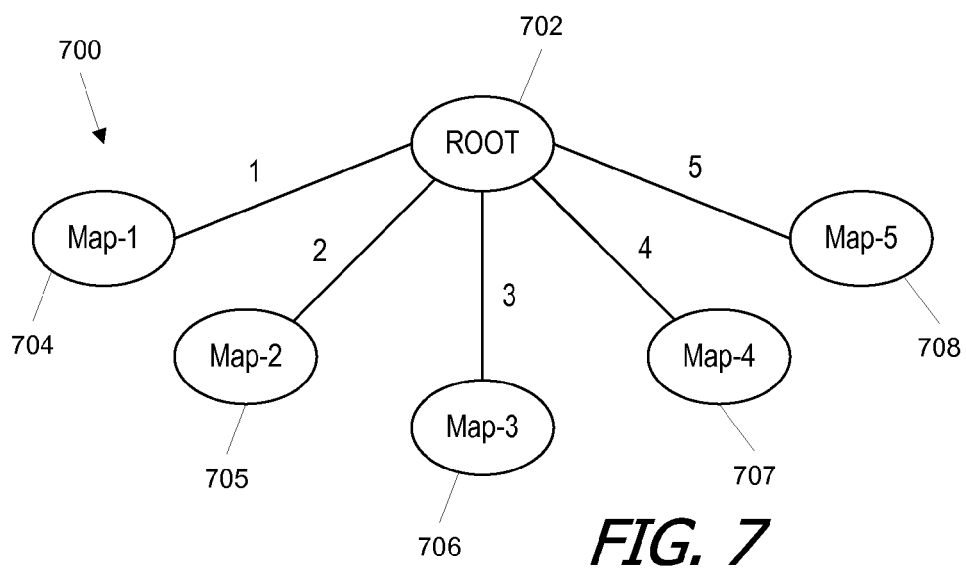
FIG. 7 is a network graph illustrating topology of a single cluster that can be formed using the process of FIG. 5 according to an embodiment of the present invention.

Further illustrating the map structure of FIG. 6, FIG. 7 is a network graph illustrating topology of a single cluster 700 formed by process 500 for an embodiment where N=5. Root node 702 is shown connected by edges to child maps (nodes) 704-708. Each edge is labeled with the index of the hash component (referred to as a "hash index") that is different between root 702 and the connected map. Thus, root 702 differs from map-1 704 in H[1], from map-2 705 in H[2] and so on. In other words, map-1 contains the 1-children of the root, map-2 the 2-children, and so on. For a particular cluster, some of maps 704-708 may be empty. In cluster 700, edit distance between maps can be determined by counting edges; thus, documents in different ones of maps 704-708 are separated by edit distance 2.

It should be noted that two documents within the same map would also have edit-distance 1 from each other, assuming exact duplicates have been consolidated. As noted above for the i=1 case, different documents in Map-i can have H[i] that are different from each other as well as from the root. However, since any two docs in the same Map-i are known to have the same hash values as the root except for H[i], their edit distance from each other is 1 because only H[i] is different.

As noted above with reference to FIG. 5, it is possible that a document can match different X(r)[i] for different clusters, that is, the same document can be at edit-distance 1 from two or more roots. FIG. 8 is a network graph illustrating such a case. Cluster 802 has root A (node 804) and three populated (i.e., non-empty) maps 806-808 corresponding to three different hash indices. Cluster 812 has root B (node 814) and two populated maps 816, 818 corresponding to two different hash indices. It is supposed that document 820 matches both X(A)[3] and X(B)[4], that is, it differs from Root-A only in H[3] and from Root-B only in H[4]. Thus, document 820 could be placed in either cluster 802 or cluster 812. However, in this example, Root A differs from Root B in at least two hashes (e.g., H[3] and H[4] are both different), so cluster 802 is separate from cluster 812.

As described above, process 500 of FIG. 5 would assign document 820 to one of clusters 802, 812 but not both. An alternative embodiment would allow document 820 to be assigned to both clusters. In this embodiment, a user request for near-duplicates of document 820 could return both clusters, and a user-request for near duplicates of another document in cluster 802 could return document 820 but not other documents in cluster 812. Thus, cluster size can be kept from increasing without limit.

Merging of Near-Duplicate Clusters

It should be noted that which documents are used as roots of clusters is in part a function of the order in which documents are processed (which can be any order). As shown in FIG. 7, the root document has a special status in that it is separated from any other document in the cluster by edit-distance 1, while child documents might be separated from each other by edit-distance 2. In general, however, it is as likely that the root and a document at edit-distance 2 from the root would actually be similar to each other as it is that a document in Map-1 and a document in Map-2 would be similar to each other. Accordingly, some embodiments provide for merging of clusters or other techniques that allow documents at larger edit distance from the root to be included in a cluster.

For example, as shown in FIG. 8, document 820 arguably belongs to both cluster 802 and cluster 812. In one set of embodiments, the clustering process described above is modified such that if a document that matches maps in two clusters is detected, the clusters are merged.

However, merging the particular clusters shown in FIG. 8 would increase the maximum edit distance between documents in the merged cluster (i.e., the cluster diameter). For example, in FIG. 8, root A 804 and root B 814 differ in H[3] and H[4]. It is also necessarily true that root A and root B have the same H[1] and H[2] because document 820 differs from root A only in H[3] and from root B only in H[4]. It follows that the path from Map-1A 806 to Map-2B 818 has edit-distance 4: H[1] must be changed to get from Map-1A to root A; H[3] and H[4] must both be changed to get from root A to root B, and H[2] must be changed to get from root B to Map-2B. Assuming the total number of hashes N is small (e.g., N=5), allowing documents in the same cluster to have edit distance 4 is a very loose constraint on similarity and can lead to a high incidence of false positives.

As discussed above, another option for handling the case shown in FIG. 8 is to assign document 820 to two clusters if it matches maps in two clusters, without merging the clusters. In another alternative embodiment, the following rule is used: If the current document has two different composite hashes that match child maps for two different clusters, the document is added to both clusters. If the document matches a child map in only one cluster, it is added to that cluster and is also used as the root of a new cluster but with only N−1 maps, corresponding to the composite hashes that did not match any cluster. The new cluster is associated with, but not merged into, the cluster that has the matching map. (If the document matches no maps in any clusters, it is used as the root of a new cluster with N maps as in process 500.) Like simple merging, this embodiment does not constrain the cluster diameter.

A variation on this embodiment allows clusters to be merged if a document matches maps in both but constrains the maximum edit distance to the root, e.g., to 2. Thus, for example, to merge clusters 812 and 802, one of the roots, e.g., root A 804, would be chosen as the root of the merged cluster, and the merge would be allowed only if every document within the merged cluster was at edit distance of not more than 2 from root A 804. In this embodiment, when a cluster merge is considered, each document in one of the clusters is compared to the root of the other; thus, processing time scales linearly with the number of documents in a cluster. Also, it should be noted that constraining the edit distance to the root places a weaker constraint on the cluster diameter. For example, if all child documents of a cluster are within edit-distance 2 of the root, it is still possible that two of the child documents could be separated by edit-distance 4, a decidedly weaker similarity constraint (especially for small N).

Another variation directly constrains the diameter of a merged cluster. Thus, for example, in the case of FIG. 8, clusters 802 and 812 would be merged only if every document in the merged cluster was within a maximum edit distance (e.g., 2) of every other document in the merged cluster. Whether this constraint is satisfied can be determined by a pairwise comparison of documents across the two clusters to be merged (by definition, any two documents within the same cluster already satisfy the constraint and would not require comparison). For this embodiment, processing time scales as the square of the average cluster size, making it practical for small clusters but less practical as cluster size increases.

Still another option is to apply a merge constraint based on cluster structure, or topology, to the clusters obtained using process 500 (where each document was assigned to only one cluster) and merge any clusters that satisfy the merge constraint. The merge constraint can be chosen to guarantee that if two clusters satisfy the constraint, merging them will not increase the cluster diameter.

For example, FIGS. 9A-9B are network graphs illustrating a topology-based merge constraint that can be used to preserve the diameter of a cluster at edit-distance 2 according to an embodiment of the present invention. As used herein, "topology" of a cluster refers generally to which possible maps within the cluster are populated. In FIG. 9A, a cluster 900 has root 902 and populated maps 904 and 906. Populated map 904 differs from root 902 in hash component H[j], and populated map 906 differs from root 904 in hash component H[k]; cluster 900 can be said to have a "j-leg" and a "k-leg." Map 908 is an empty, or unpopulated, map, as indicated by the broken lines. Document 910 differs from Map-j 904 in hash H[k], and document 912 differs from Map-j 904 in hash H[1]. It can be seen that the edit distance from Map-k 906 to document 910 is 2, as only H[k] and H[j] are different between the two. Thus, document 910 can be added to cluster 900 without increasing the diameter of the cluster. However, if map-k 908 were populated (i.e., if cluster 900 had an l-leg) adding document 910 would increase the diameter of the cluster, as the edit distance from document 910 to a document in map-l 908 is three: H[k], H[j], and H[1] are different.

Similarly, it can be seen that the edit distance from Map-k 906 to document 912 is 3, as H[j], H[1], and H[k] are all different between the two. Thus, document 912 cannot be added to cluster 900 without increasing the diameter of the cluster. More generally, as long as a cluster has only two populated child maps (or two legs), a document that differs from either child map in the same hash index as either of the existing child maps can always be added without increasing the cluster diameter; a document that differs from a child map in any other hash index might increase the cluster diameter.

Further, if the cluster has three or more populated child maps (or three or more legs), adding any document at edit distance 2 from the root might increase the cluster diameter.

FIG. 9B illustrates an extension of this principle to the case where document 910 of FIG. 9A is the root 950 of a cluster 920. As before, cluster 900 has only a j-leg and a k-leg. As can be seen from FIG. 9B, as long as cluster 950 also has only a j-leg (Map-j 952) and a k-leg (Map-k 954), merging cluster 950 with cluster 900 will not increase the cluster diameter. If, however, cluster 950 also has a different leg, e.g., an l-leg (Map-l 956) as shown in broken lines, merging cluster 950 with cluster 900 may increase cluster diameter.

Thus, the following "Two-Leg" constraint can be used to merge clusters without increasing the cluster diameter beyond edit-distance 2: If two clusters whose root documents are at edit distance 2 (or less) each have the same two (or fewer) legs, then merge the clusters; otherwise, do not merge the clusters. This Two-Leg constraint does not require a pairwise comparison of documents in the clusters to be merged; in embodiments where cluster topology information is accessible, it can be applied simply by comparing cluster topologies. It should be noted that this constraint will not necessarily result in merging all clusters that could be merged without increasing the diameter, but it does permit efficient merging, independent of cluster size, while enforcing the constraint that merging does not increase the cluster diameter.

Figure 10:
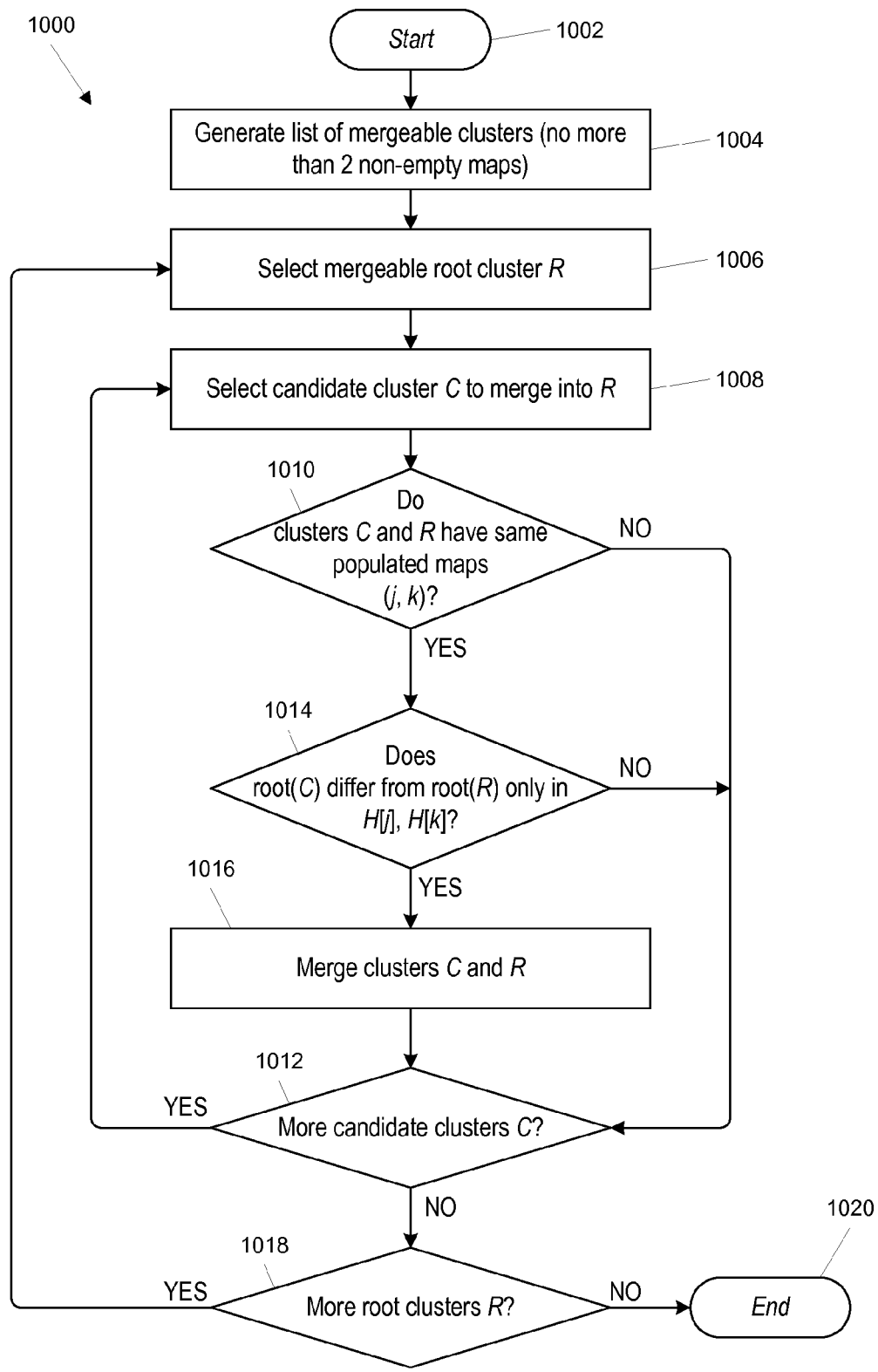
FIG. 10 is a flow diagram of a process for merging clusters according to an embodiment of the present invention.

FIG. 10 is a flow diagram of a process 1000 for merging clusters according to an embodiment of the present invention. Process 1000 applies the Two-Leg rule to clusters generated using process 500 of FIG. 5 or another process that clusters documents within edit distance 1 of a root document.

Process 1000 starts (block 1002) with a list of clusters, which can be represented, e.g., using the cluster data structure of FIG. 6. At block 1004, a list of mergeable clusters is generated. Under the Two-Leg constraint, only clusters with two or fewer legs (or two or fewer populated child maps) can be merged, and the list generated at block 1004 would include only these clusters. It is noted that for the data structure of FIG. 6, a cluster's mergeability status can be determined by reading the mapCount array and determining whether the number of nonzero elements exceeds 2. Alternatively, the data structure of FIG. 6 can be extended to directly indicate the number of populated child maps.

At block 1006 a root cluster R for merging is selected, and at block 1008 a candidate cluster C to be merged into root cluster R is selected. For example, in one embodiment C can be any cluster whose root document is at edit distance of 2 from the root of cluster R. (Note that where clusters are formed using process 500 of FIG. 5, root documents of different clusters would not have edit distance less than 2.) At block 1010, it is determined whether the clusters R and C have the same legs (or the same populated child maps). For example, in the data structure of FIG. 6, the elements of the mapCount array for each cluster indicate which child maps are populated (e.g., map-i is populated if mapCount[i] is nonzero), and block 1010 can include comparing the arrays. Alternatively, the data structure of FIG. 6 can be extended, e.g., with a bit mask indicating which child maps are populated, and block 1010 can include comparing the bit masks. If the clusters R and C do not have the same legs, they cannot be merged, and process 1000 proceeds to block 1012 to consider another candidate cluster C.

If, however, the clusters R and C do have the same legs, then process 1000 proceeds to block 1014, where it is determined whether the roots of clusters C and R differ from each other only in the two indices associated with their two (or fewer) legs. For example, using the data structure of FIG. 6, the global hashes X[0] (which include all N hashes) of the two roots can be read and compared to determine which hash components are different. If the roots of the clusters differ in the same two hash components that are associated with their legs, then at block 1016, the clusters are merged; otherwise, they are not merged.

Whether or not the clusters are merged, process 1000 can proceed to block 1012 to determine whether more clusters C should be considered for merging with the root cluster R. If so, process 1000 returns to block 1008 to select another cluster C. If not, process 1000 proceeds to block 1018 to determine whether another cluster should be tested as a root cluster R. For instance, in some embodiments, only clusters that have not already been merged into another cluster would be usable as root clusters. If additional usable root clusters remain, process 1000 returns to block 1006 to select a new root cluster R. Once all possible root clusters have been tested, process 1000 ends at block 1020.

It will be appreciated that process 1000 is illustrative and that variations and modifications are possible. Steps described as sequential may be executed in parallel, order of steps may be varied, and steps may be modified, combined, added or omitted. For instance, in one alternative implementation, all clusters having the same two or fewer populated maps can be grouped together, and pairwise comparison of the hash vectors for root documents can take place within each group. The particular order in which clusters are merged is not critical, and which cluster is selected as the root of the merged cluster is also not critical.

Clustering with Relaxed Edit-Distance Constraint

In embodiments described above, the initial clustering used edit-distance 1 from a root document; resulting in a maximum cluster diameter of 2. Further, certain embodiments provide for merging of clusters subject to the same constraint on cluster diameter. Thus, in these embodiments, near-duplicates are documents with edit distance les than or equal to M=2. Where the documents are represented using hash vectors with a relatively small number N of components (e.g., N=5), the M=2 constraint is generally desirable to control false positives. However, if the number of hashes used to represent the documents is increased, the M=2 constraint can be relaxed without unacceptably increasing the number of false positives.

Thus, for example, in some embodiments, it may be desirable to perform the initial clustering with a relaxed constraint, e.g., clustering all documents within edit-distance 2 of the root. Such clusters can have larger diameters than the clusters described above.

Figure 11A:
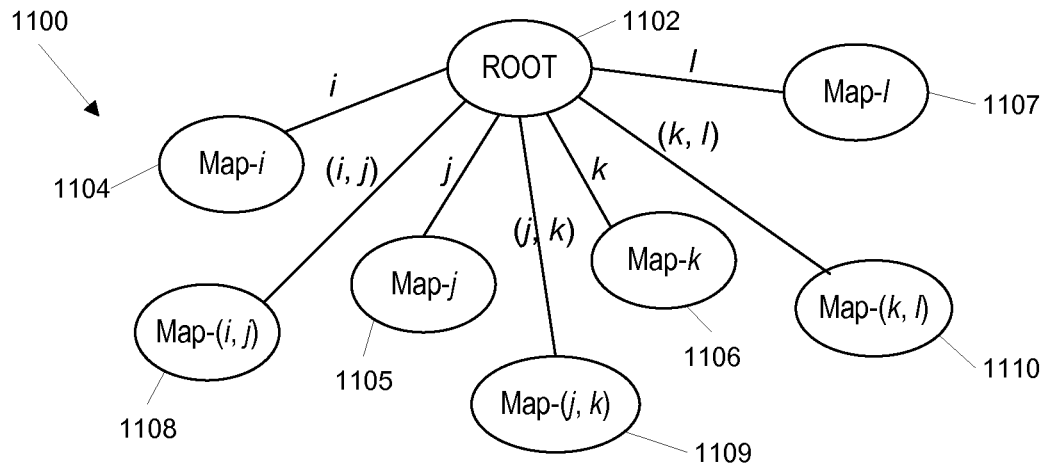
FIGS. 11A and 11B are network graphs illustrating clusters according to further embodiments of the present invention.

For example, FIG. 11A is a network graph illustrating a cluster 1100 according to another embodiment of the invention. All documents in cluster 1100 are within edit-distance 2 of root 1102. The cluster is arranged in a number of maps 1104-1110 according to which hash component(s) is (are) different between documents in the map and root 1102, and the various edges, or legs, are labeled with the one or two hash indices (i,j, k, l) that differ from the root. Maps 1104-1107 are at edit-distance 1 from the root, while maps 1108-1110 are at edit-distance 2 from the root.

In general, for N-dimensional hash vectors, cluster 1100 can have N(N+1)/2 child maps (or legs), and the edit distance between documents in cluster 1100 can be as large as 4. For instance, given a document in map-(i, j) 1108 and a document in map-(k, l) 1110, the edit distance is four, as the documents in map-(i, j) 1108 differ from the root in both the i and j hash indices (but not in the k or l index), while the documents in map-(k, l) 1110 differ from the root in both the k and l hash indices (but not in the i or j index); thus, four hash components would have to change to transform from one map to the other. In general, for a cluster defined by reference to a maximum edit distance $E_{max}$ from the root, the cluster diameter could be as high as $2E_{max}$; clusters such as cluster 1100 are referred to herein as "unconstrained" clusters. Depending in part on $E_{max}$ and the total number of hashes N, unconstrained clusters can include a substantial number of false positives.

Figure 11B:
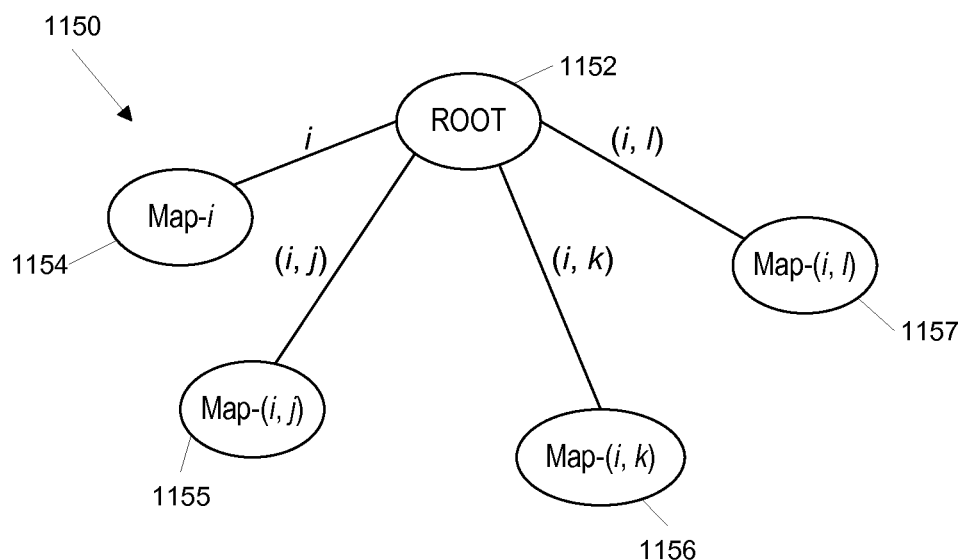

FIG. 11B is a network graph illustrating another cluster 1150 according to another embodiment of the invention. Cluster 1150 has root 1152 and maps 1154-1157. Cluster 1152 is formed by selecting one of the possible maps (or legs) at edit-distance 1 from the root (map-i 1154, or the i-leg, in this example) and only those maps at edit-distance 2 from the root that differ in the same hash component as the selected edit-distance 1 map (maps 1155-1157 in this example). If root 1152 has near-duplicates at edit distance 1 in other hash components, then root 1152 can be used as the root of another cluster for each such component. Alternatively, documents that would otherwise be added to the "non-i" child maps of cluster 1150 can instead be used as roots of separate clusters.

Cluster 1150 is referred to as a "constrained" cluster because the legs are constrained to have one particular hash index in common. As a result of the constraint, for N-dimensional hash vectors, cluster 1150 can have up to N child maps (or legs)—one map at edit-distance 1 plus N−1 maps at edit distance 2.

Within constrained cluster 1150, the maximum edit distance is 3 instead of 4. For example, a document in map-(i, j) 1155 differs from root 1152 in the i and j hash components, for an edit distance of 2. A document in map-(i, k) 1156 differs from root 1152 in the i and k hash components. Thus, documents in map 1155 and 1156 differ from each other in the j and k hashes and might also differ from each other in the i hash component, for a maximum edit distance of 3.

More generally, the edit distance from a child document in a cluster to the root corresponds to the number of unique hash indices that appear along the path from the child to the root. This fact can be used to constrain cluster diameter. For example, consider two documents $d_1$ and $d_2$ within a cluster (e.g., of the kind shown herein) with a root document r. Suppose that $Z_1$ represents the set of indices of hashes that would be changed on the path from $d_1$ to r, and $Z_2$ represents the set of indices of hashes that would be changed on the path from $d_2$ to r. It follows that the edit distance between $d_1$ and $d_2$ has an upper bound ($E_{bound}$) given by:

$$E_{bound}(d_1, d_2) = |Z_1| + |Z_2| - |Z_1 \cap Z_2|, \quad \text{(Eq. 1)}$$

where the notation $|Z|$ represents the cardinality of a set Z.

Figure 12:
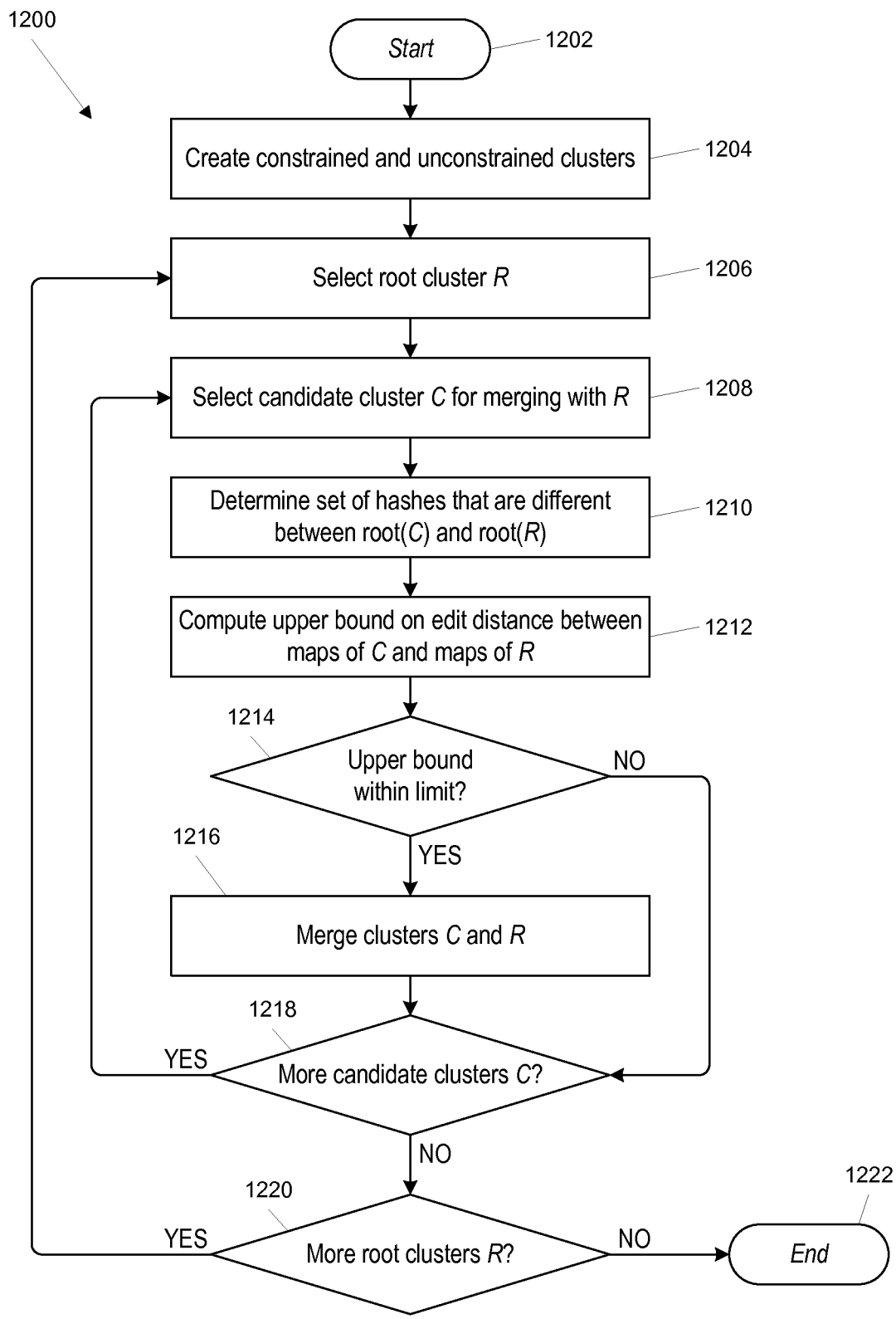
FIG. 12 is a flow diagram of another process for clustering near-duplicates according to an embodiment of the present invention.

This rule can be used to provide a more general clustering technique that constrains maximum edit distance within a cluster to a desired limit M. FIG. 12 is a flow diagram of a process 1200 for clustering according to an embodiment of the present invention that uses a hash-index-based constraint on edit distance.

Process 1200 begins (block 1202) with a set of documents represented as N-dimensional hash vectors, e.g., using the transformations of FIG. 2. At block 1204, clusters are created based on edit distance from a root document, e.g., as described above with reference to FIG. 11. In one embodiment, the edit distance from the root is limited to 2; other limits may also be used. The clusters can include both constrained clusters (e.g., cluster 1150 of FIG. 11B) and unconstrained clusters (e.g., cluster 1100 of FIG. 11A). In one embodiment, if a document can be added to either a constrained cluster or an unconstrained cluster, the constrained cluster is preferred; other embodiments may use other rules for determining how to cluster a document that could be included in multiple clusters. The clustering process can be generally similar to process 500 of FIG. 5, except for the relaxed constraint on edit distance from the root.

Once the clusters have been created, merging can begin. At block 1206, a root cluster R is selected, and at block 1208, a candidate cluster C for merging with R is selected. Candidate cluster C can be, for example, a cluster whose root is within edit-distance 1 of one of the child maps of cluster R. At block 1210, the hash vectors of the roots of clusters C and R are compared to determine which hash components are different between them. At block 1212, using the information from block 1210 in conjunction with information about the maps of clusters C and R, an upper bound on the edit distance between any two documents in the clusters is computed. For example, for any map $M_C$ in cluster C and any map $M_R$ in cluster R, the upper bound $E_{bound}(M_C, M_R)$ on the edit distance between them can be computed using Eq. (1) above. Repeating this for each pair of maps $M_C$, $M_R$ and selecting the largest $E_{bound}$ value for any pair of maps yields an upper bound on the diameter of the merged cluster.

In some embodiments, various optimizations can be used to simplify or speed up the merging operations. For example, merging may be allowed only if the clusters to be merged do not already exceed a maximum diameter (e.g., 1 or 2).

At block 1214, if the upper bound is within a preset limit, clusters C and R are merged at block 1216. The preset limit can be a maximum desired cluster diameter and can be selected as a matter of design choice based in part on the number N of hashes. In general, the choice of the number of hashes and the maximum cluster diameter is based on design tradeoffs between the computational burden of identifying near-duplicate documents and the degree of difference that is considered tolerable between near-duplicate documents. Using larger values of N and requiring more hashes to match between the two documents will ensure that documents are very similar to each other before they are considered near-duplicates. However, large values of N would also increase the computational cost of identifying near duplicate clusters.

At block 1218, regardless of whether the clusters were merged, it is determined whether more candidate clusters C for merging with R remain; if so, process 1200 returns to block 1208 to select and process the next cluster C. If not, process 1200 proceeds to block 1220 to determine whether more root clusters remain to be considered; if so, process 1200 returns to block 1206 to select and process the next root cluster R. Once all merge possibilities have been considered, process 1200 ends (block 1222).

It will be appreciated that process 1200 is illustrative and that variations and modifications are possible. Steps described as sequential may be executed in parallel, order of steps may be varied, and steps may be modified, combined, added or omitted. For instance, as with other embodiments, the dimension N of the hash vectors can be varied, and the maximum allowed edit distance from the root of a cluster to a child map or the maximum cluster diameter, can also be varied. In addition, instead of using Eq. (1) applied to maps, pairwise comparison of documents and direct computation of edit distance can be used to determine whether to merge clusters.

Further Clustering Algorithms

Some of the embodiments described above constrain the maximum diameter of a cluster. Alternative techniques allow clusters to grow without a limit on maximum diameter. In one such technique, a map can be maintained for each composite hash, and groups of documents having a matching composite hash can be associated with each other as well as with clusters. For example, suppose that document a belongs to cluster C3 and has composite hash vector X(a). If another document b has composite hash vector X(b) and a composite hash component matches a corresponding component of X(a) (e.g., X(b)[k] matches X(a)[k] for some k), then document b is added to cluster C3, and document b is also added to a list of documents associated with the value X(a)[2]. In addition, if another component of X(b) (e.g., X(b)(1) for some l≠k) has a value not previously encountered, a new map is created for that composite hash. The new map entry can point to document b, which in turn can point to cluster C3. This technique allows documents to be added at arbitrary distance from the first document in a cluster. This creates large clusters of documents, with possible loss of similarity.

In another approach, documents can be added to a cluster subject to a constraint on "depth," or edit distance to the root of the cluster. For example, the maximum depth can be limited to 2 (in which case the maximum cluster diameter would be 4). In one embodiment, for each document that is added to a cluster, a map of its depth (e.g., an edit path from the root indicating which hash components are different from the root) is also stored, and new documents can be added if the resulting depth is not greater than the limit. Alternatively, a depth constraint can be imposed by directly determining the edit distance of the document being considered for addition to the root of the cluster.

In still another approach that directly constrains maximum cluster diameter, an exhaustive comparison of every document (in the cluster to a document to be added can be made to determine whether the constraint is satisfied.

Use of Near-Duplicate Clusters

The processes described above can produce a set of cluster data structures (e.g., as shown in FIG. 6) representing clusters of documents identified as near-duplicates of each other. These cluster data structures can be stored for later use, e.g., as ND Clusters 129 in document information data store 124 of FIG. 1. Thus, generation of near-duplicate clusters need not be performed in real time; for example, the clusters can be generated during an initial document intake process and stored for later access by a user.

Near-duplicate clustering can facilitate various user interactions with the documents. For example, a user of system 100 of FIG. 1 may operate user interface 108 in connection with a document-review program (not explicitly shown) executed by CPU 102 to retrieve and review documents. In some embodiments, the user can annotate documents, assign documents or groups of documents to other reviewers, etc. For example, the user can select a document to view, and the viewing interface may include a button or other control that the user can operate to view a list of near-duplicates of the document being viewed. In one embodiment, the document-review program can locate the document identifier of the document being viewed within one of clusters 129 and can generate a list of near-duplicates using the other document identifiers in the cluster. The user can view the list of near-duplicates, select documents from that list for viewing, assign the current document and its near-duplicates as a group to another reviewer, apply an annotation to the entire group, and so on.

Further Embodiments

While the invention has been described with respect to specific embodiments, one skilled in the art will recognize that numerous modifications are possible. For instance, as noted, the dimensionality of the hash vectors representing the documents, the definition of each hash component, and the particular edit distance constraints can be modified. Composite hashes as described above can be used to facilitate hash-vector comparisons but are not required. The particular content of the dictionary used to define the word space and the assignment of dictionary words to hash components can be varied as desired. As noted above, in some embodiments, the assignment is random, but non-random assignments can also be used.

Embodiments described above make reference to transforming a document to a hash vector consisting of N hash components, where each hash component is defined as a hash function on some set of words that might or might not occur in the document. The invention, however, is not limited to hash functions or hash vectors. More generally, other N-dimensional vector representations of a document could be used, and the invention is not limited to hash vectors. For example, functions other than hash functions can be defined that are based on the counts of various words, and any set of N such functions over different subsets of the word space can be used as components of a vector representation of the document. In some embodiments, the functions are orthogonal (e.g., based on disjoint subsets of the dictionary words); however, this is not required.

In general, for any N-dimensional vector representation of a document, an edit distance between two documents can be defined based on the difference between their vectors. In some embodiments, edit distance can be defined as the number of vector components that are different between the documents, as in the hash-vector embodiments described above. In embodiments where the vector representation is based on component functions that exhibit locality (unlike hash functions), components that are similar but not necessarily identical can be treated as matching. For example, corresponding components of two vectors can be treated as matching if the values are within some tolerance window (e.g., 2% or 5%); the optimum tolerance window will depend on the particular function used to compute the vector components. Alternatively, if the component functions exhibit locality, the edit distance can be defined based on the vector difference between the document vectors.

In any event, clusters can be formed by applying a first edit-distance constraint (i.e., a constraint limiting the dissimilarity between document vectors) relative to an arbitrarily chosen root document, and clusters can then be merged subject to a second edit-distance constraint that constrains overall cluster diameter (i.e., the maximum edit distance between any two documents in the cluster). This second edit-distance constraint can be based on cluster structure or topology, thereby avoiding the need for pairwise comparison of the documents in clusters to be merged.

Thus, while the examples described above make specific reference to "hash vectors," where each vector component is computed using a hash function, similar techniques can be applied to other N-dimensional vector representations, and the present invention is not limited to hash vectors.

It is also noted that near-duplicate clustering as described herein can be a separate process from semantic clustering of documents. As is known in the art, in semantic clustering, documents are grouped into clusters based on the topics to which they pertain; a number of algorithms and products for semantic clustering exist. Document analysis in semantic clustering algorithms focuses on determining the topic to which a given document pertains (e.g., income taxes or Japan), and documents whose content is quite different can be clustered together if they pertain to the same topic. For instance, an editorial arguing against an income tax increase might be grouped with a news article describing how much a celebrity paid in income taxes, but such articles would likely not be near-duplicates of each other. Thus, semantic clustering and near-duplicate clustering represent two different approaches to organizing content that can be used independently of each other, and a given document may be assigned to a near-duplicate cluster independently of any semantic clusters to which the document might also be assigned.

In some embodiments, near-duplicate clustering can be used in conjunction with semantic clustering. For example, while as a general rule not all documents in a semantic cluster are near-duplicates, it is likely that any near-duplicates of a given document would be placed in the same semantic cluster. Accordingly, in some embodiments, semantic clustering of the documents can be performed first, and near-duplicate clustering can be performed for documents within the same semantic cluster, thereby reducing the size of the document set considered during near-duplicate clustering and potentially speeding up near-duplicate clustering. In other embodiments, near-duplicate clustering can be performed first, and one document from a near-duplicate cluster (e.g., the root document) can be used as representative of the entire near-duplicate cluster for purposes of semantic clustering, thereby reducing the size of the document set considered during semantic clustering and potentially speeding up semantic clustering.

As described above, embodiments of the present invention may be implemented as computer programs. Such programs may be encoded on various computer readable media for storage and/or transmission; suitable media include magnetic disk or tape, optical storage media such as compact disk (CD) or DVD (digital versatile disk), flash memory, and the like. Computer readable media encoded with the program code may be packaged with a device (e.g., microprocessor) capable of executing the program or provided separately from such devices.

In addition, while the embodiments described above may make reference to specific hardware and software components, those skilled in the art will appreciate that different combinations of hardware and/or software components may also be used and that particular operations described as being implemented in hardware might also be implemented in software or vice versa.

Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Thus, although the invention has been described with respect to specific embodiments, it will be appreciated that the invention is intended to cover all modifications and equivalents within the scope of the following claims.

What is claimed is:

1. In a computer system having a processor and a computer-readable storage medium, a method for grouping near-duplicate documents, the method comprising:
for each document in a corpus of documents to be analyzed, computing, by the processor, a hash vector based on word count information for the document, the hash vector including a plurality of components;
assigning, by the processor, each document to one of a plurality of initial clusters of documents, wherein each of the initial clusters contains a root document and at least some of the initial clusters further contain at least one child document, and wherein each of the child documents of any one of the initial clusters satisfies a first edit-distance constraint relative to the root document of that one of the initial clusters, the first edit-distance constraint being defined as an upper limit on a number of components of the hash vectors that are different between the root document and the child document;
merging, by the processor, the initial clusters to form a plurality of final clusters based on a second edit-distance constraint; and
storing in the computer readable storage medium, by the processor, a list of the documents associated with each of the final clusters,
wherein assigning each document to one of the initial clusters includes:
for a target one of the documents, comparing the hash vector of the target document with the hash vector of the root document of the initial cluster to determine whether the first edit distance constraint is satisfied;
in response to a determination that the first edit distance constraint is satisfied, adding the target document as a child document to the initial cluster, by storing an identifier of the target document in the computer-readable storage medium in association with the initial cluster; and
in response to a determination that the first edit distance constraint is not satisfied, adding a new cluster to a list of the initial clusters in the computer-readable storage medium, wherein the target document is the root document of the new cluster.

2. The method of claim 1 wherein the storing includes storing the list of the documents associated with each of the final clusters such that all documents associated with a same one of the final clusters are accessible by reference to any one of the documents associated with that one of the final clusters.

3. The method of claim 1 wherein the components of the hash vector are orthogonal to each other.

4. The method of claim 1 wherein the first-edit distance constraint corresponds to an upper limit on the number of components of the hash vector that are different between the root document and the target document.

5. The method of claim 4 wherein the merging includes:
for each of the initial clusters that has at least one child document, grouping the child documents into one or more maps, wherein all of the child documents that are grouped within a same map have hash vectors that differ from the root document of the cluster in the same one or more of the components;
determining whether the number of maps for a first one of the initial clusters is at or below an upper bound;
determining whether the number of maps for a second one of the initial clusters is at or below an upper bound; and
in the event that the number of maps for the first initial cluster and the number of maps for the second initial cluster are at or below the upper bound:
determining whether the maps for the first initial cluster correspond to differences from the root document in the same one or more of the plurality of components of the hash vector as the maps for the second initial cluster; and
merging the first initial cluster and the second initial cluster in the event that the maps for the first cluster correspond to differences in the same one or more of the plurality of components of the hash vector as the maps for the second cluster.

6. The method of claim 5 wherein the upper limit on the number of components of the hash vector that are different is 1 and the upper bound on the number of maps is 2.

7. The method of claim 4 wherein the second edit-distance constraint is defined such that merging does not increase a diameter of a cluster.

8. The method of claim 7 further comprising selecting the second initial cluster, wherein the second initial cluster is selected from the initial clusters that have a diameter not greater than 2.

9. A system for analyzing documents, the system comprising:
a document information data store to store a vector representation of each of a plurality of documents, the vector representation being based on frequency of occurrence within the document of words from a dictionary, wherein the vector representation has a dimension that is small compared to the number of words in the dictionary;
a processor to form initial clusters of near-duplicate documents based on the vector representations in the document information data store and to store cluster information in the document information data store, the cluster information including a list of the documents associated with each of the initial clusters of near-duplicate documents,
wherein the processor is further to form final clusters of near-duplicate documents from the initial clusters by merging some or all of the initial clusters by applying a second edit-distance constraint to the initial clusters,
wherein, to form one of the initial clusters, the processor is to:
select an extant cluster from a list of extant clusters, each extant cluster including a root document;
for a target one of the documents, compare the hash vector of the target document with the hash vector of the root document of the extant cluster to determine whether the first edit distance constraint is satisfied;
in response to a determination that the first edit distance constraint is satisfied, add the target document as a child document to the extant cluster, including storing an identifier of the target document in the document information data store in association with the extant cluster; and
in response to a determination that the first edit distance constraint is not satisfied, add a new cluster to the list of extant clusters, wherein the target document is the root document of the new cluster.

10. The system of claim 9 wherein the first edit-distance constraint is based on comparing components of vector representations of different ones of the plurality of documents.

11. The system of claim 9 wherein the processor is further to generate the vector representation of each of the plurality of documents and to store the vector representations in the document information data store.

12. The system of claim 11 wherein the vector representation comprises a hash vector and wherein the processor is further to generate each component of the hash vector by applying a hash function to a different subset of the words in the dictionary.

13. The system of claim 12 wherein the dimension of the vector representation is less than 10.

14. The system of claim 9 further comprising a user interface to allow a user to select a document from the plurality of documents and to view a list of all other documents in the same final cluster as the selected document.

15. A non-transitory computer-readable storage medium containing program instructions, which when executed by a processor cause the processor to:
for each document in a corpus of documents to be analyzed, access a document vector that includes a plurality of components, each of the components being based on word count information for the document;
assign each document to one of a plurality of initial clusters of documents, wherein each of the initial clusters contains a root document and at least some of the initial clusters further contain at least one child document, and wherein each of the child documents of any one of the initial clusters satisfies a first edit-distance constraint relative to the root document of that one of the initial clusters, the first edit-distance constraint being defined as a minimum degree of similarity between the document vectors of the root document and the child document;
merge at least some of the initial clusters to form a plurality of final clusters, wherein during the merging, a first one and a second one of the initial clusters are merged in the event that the first one of the initial clusters satisfies a second edit-distance constraint relative to the second one of the initial clusters; and
store, in a document information data store, a list of the documents associated with each of the final clusters,
wherein, to assign each document to one of the initial clusters, the instructions cause the processor to:
for a target one of the documents, compare the hash vector of the target document with the hash vector of the root document of the initial cluster to determine whether the first edit distance constraint is satisfied;
in response to a determination that the first edit distance constraint is satisfied, add the target document as a child document to the initial cluster, by storing an identifier of the target document in association with the initial cluster; and
in response to a determination that the first edit distance constraint is not satisfied, add a new cluster to a list of the initial clusters, wherein the target document is the root document of the new cluster.

16. The computer-readable storage medium of claim 15, wherein to access the document vector, the processor is to compute the document vector.

17. The non-transitory computer-readable storage medium of claim 16, wherein to compute the document vector for one of the documents, the processor is to:
determine a number of occurrences within the document of each of a plurality of words from a dictionary; and
for each of a plurality of subsets of the words from the dictionary, compute a hash function of a bit field representing the number of occurrences of each of the words in that subset.

18. The non-transitory computer-readable storage medium of claim 15, wherein to access the document vector, the processor is to read the document vector from a document information data store.

19. The non-transitory computer-readable storage medium of claim 15, wherein the first edit constraint is an upper limit on the number of components of the document vectors that are different between the root document and any of the child documents within a same one of the initial clusters.

20. The non-transitory computer-readable storage medium of claim 19, wherein the second edit-distance constraint is a constraint limiting a diameter of each of the final clusters.

* * * * *